(12) United States Patent
Wells et al.

(10) Patent No.: US 12,275,266 B2
(45) Date of Patent: Apr. 15, 2025

(54) DOCUMENT BOUNDARY ANALYSIS

(71) Applicant: Jumio Corporation, Sunnyvale, CA (US)

(72) Inventors: Stuart Wells, Saratoga, CA (US); Daryl Huff, Saratoga, CA (US); Attila Balogh, Vienna (AT); Thomas Krump, Buchkirken (AT); Anshuman Vikram Singh, Vienna (AT)

(73) Assignee: Jumio Corporation, Sunnyvale, CA (US)

( * ) Notice: Subject to any disclaimer, the term of this patent is extended or adjusted under 35 U.S.C. 154(b) by 0 days.

(21) Appl. No.: 18/345,152

(22) Filed: Jun. 30, 2023

(65) Prior Publication Data

US 2024/0217255 A1 Jul. 4, 2024

Related U.S. Application Data

(63) Continuation-in-part of application No. 18/193,669, filed on Mar. 31, 2023, and a continuation-in-part of application No. 18/193,736, filed on Mar. 31, 2023, and a continuation-in-part of application No. 18/193,675, filed on Mar. 31, 2023, and a continuation-in-part of application No. 18/193,732, filed on Mar. 31, 2023, said application No. 18/193,736 is a continuation-in-part of application (Continued)

(51) Int. Cl.
*B42D 25/328* (2014.01)
*B42D 25/333* (2014.01)

(52) U.S. Cl.
CPC ......... *B42D 25/328* (2014.10); *B42D 25/333* (2014.10)

(58) Field of Classification Search
CPC ............................ B42D 25/328; B42D 25/333
USPC .................. 283/67, 70, 72, 74, 113, 901
See application file for complete search history.

(56) References Cited

U.S. PATENT DOCUMENTS

| 4,897,814 A | 1/1990 | Clark |
| 5,544,255 A | 8/1996 | Smithies et al. |

(Continued)

FOREIGN PATENT DOCUMENTS

MY             192715 A      9/2022

OTHER PUBLICATIONS

Zhang, Erhu, et al. "Forgery Detection for Perforated Number in Security Document by Analysing the Perforated Holes." The Imaging Science Journal 65.1 (2017): 40-48. Web.

(Continued)

*Primary Examiner* — Justin V Lewis
(74) *Attorney, Agent, or Firm* — Patent Law Works LLP

(57) ABSTRACT

The disclosure includes a system and method for obtaining, using one or more processors, at least one image of a document under test; obtaining, using the one or more processors, an edge domain representation of a first portion of the document under test; comparing, using the one or more processors, the edge domain representation of the first portion of the document under test to an edge domain representation of a corresponding portion of one or more valid document instances; and modifying, using one or more processors, a likelihood that the document under test is accepted as valid, or rejected as invalid, based on the comparison of the edge domain representations associated with the document under test and corresponding portion associated with one or more valid document instances.

18 Claims, 18 Drawing Sheets

Related U.S. Application Data

No. 18/148,544, filed on Dec. 30, 2022, said application No. 18/193,669 is a continuation-in-part of application No. 18/148,542, filed on Dec. 30, 2022, said application No. 18/193,732 is a continuation-in-part of application No. 18/148,544, filed on Dec. 30, 2022, said application No. 18/193,736 is a continuation-in-part of application No. 18/148,536, filed on Dec. 30, 2022, said application No. 18/193,675 is a continuation-in-part of application No. 18/148,536, filed on Dec. 30, 2022, said application No. 18/193,669 is a continuation-in-part of application No. 18/148,536, filed on Dec. 30, 2022, and a continuation-in-part of application No. 18/148,544, filed on Dec. 30, 2022, said application No. 18/193,675 is a continuation-in-part of application No. 18/148,542, filed on Dec. 30, 2022, and a continuation-in-part of application No. 18/148,544, filed on Dec. 30, 2022, said application No. 18/193,732 is a continuation-in-part of application No. 18/148,542, filed on Dec. 30, 2022, said application No. 18/193,736 is a continuation-in-part of application No. 18/148,542, filed on Dec. 30, 2022, said application No. 18/193,732 is a continuation-in-part of application No. 18/148,536, filed on Dec. 30, 2022.

(56) References Cited

U.S. PATENT DOCUMENTS

| | | |
|---|---|---|
| 5,668,897 A | 9/1997 | Stolfo |
| 5,748,780 A | 5/1998 | Stolfo |
| 6,363,162 B1 | 3/2002 | Moed et al. |
| 7,040,539 B1 | 5/2006 | Stover |
| 7,831,531 B1 | 11/2010 | Baluja et al. |
| 8,326,761 B1 | 12/2012 | Hecht et al. |
| 8,352,494 B1 | 1/2013 | Badoiu |
| 8,886,648 B1 | 11/2014 | Procopio et al. |
| 9,135,517 B1 | 9/2015 | Adams |
| 11,416,562 B1 | 8/2022 | Gruhl et al. |
| 11,593,439 B1 | 2/2023 | Avadhani et al. |
| 11,715,102 B2 | 8/2023 | Edwards et al. |
| 2003/0172066 A1 | 9/2003 | Cooper et al. |
| 2006/0041506 A1 | 2/2006 | Mason et al. |
| 2006/0124726 A1 | 6/2006 | Kotovich et al. |
| 2007/0078846 A1 | 4/2007 | Gulli et al. |
| 2007/0086628 A1 | 4/2007 | Fuchs et al. |
| 2007/0116328 A1 | 5/2007 | Sablak |
| 2008/0065630 A1 | 3/2008 | Luo et al. |
| 2008/0149713 A1 | 6/2008 | Brundage |
| 2009/0261158 A1 | 10/2009 | Lawson |
| 2010/0027896 A1 | 2/2010 | Geva et al. |
| 2011/0057040 A1* | 3/2011 | Jones ............... B42D 25/41 235/487 |
| 2014/0002872 A1 | 1/2014 | Cook |
| 2015/0100590 A1 | 4/2015 | Robinson et al. |
| 2015/0242592 A1 | 8/2015 | Weiss et al. |
| 2016/0098399 A1 | 4/2016 | Casperson |
| 2016/0210450 A1 | 7/2016 | Su |
| 2017/0161375 A1 | 6/2017 | Stoica et al. |
| 2017/0193285 A1 | 7/2017 | Negi |
| 2017/0337449 A1 | 11/2017 | Hamada et al. |
| 2018/0075090 A1 | 3/2018 | Knight et al. |
| 2018/0186164 A1 | 7/2018 | Wu |
| 2018/0204113 A1 | 7/2018 | Galron et al. |
| 2018/0293461 A1 | 10/2018 | Le et al. |
| 2018/0300296 A1 | 10/2018 | Ziraknejad et al. |
| 2018/0373859 A1 | 12/2018 | Ganong |
| 2019/0035431 A1 | 1/2019 | Attorre |
| 2019/0272549 A1 | 9/2019 | Mossoba et al. |
| 2019/0278986 A1 | 9/2019 | Nepomniachtchi |
| 2020/0184201 A1 | 6/2020 | Kaehler |
| 2020/0304650 A1 | 9/2020 | Roach |
| 2021/0124919 A1 | 4/2021 | Balakrishnan |
| 2021/0320801 A1 | 10/2021 | Wyss |
| 2022/0028086 A1 | 1/2022 | Woodard et al. |
| 2022/0058660 A1 | 2/2022 | Ivanov |
| 2022/0385880 A1 | 12/2022 | Nims |
| 2023/0017185 A1 | 1/2023 | Cheong et al. |
| 2023/0113148 A1 | 4/2023 | Zlotnick |
| 2023/0129350 A1 | 4/2023 | Bryan et al. |

OTHER PUBLICATIONS

"7 Best Face Morph Apps 2024 (Morph Two Faces Together)." ContentMaverickscom, Content Mavericks, 2024, contentmavericks.com/best-face-morph-app/. 2024 Web. 25 pgs. 2024.

"Levenshtein Distance." Wikipedia, Wikimedia Foundation, Dec. 23, 2023, en.wikipedia.org/wiki/Levenshtein_distance. Web. 6 pgs. 2023.

"New Method Detects Deepfake Videos with up to 99% Accuracy." News, May 3, 2022, news.ucr.edu/articles/2022/05/03/new-method-detects-deepfake-videos-99-accuracy. Web. 3 pgs. 2022.

Bassil, Youssef, and Mohammad Alwani. "Context-Sensitive Spelling Correction Using Google Web 1T 5-Gram Information." Computer and Information Science (Toronto), vol. 5, No. 3, 2012, p. 37. 2012.

Bassil, Youssef, and Mohammad Alwani. "OCR Post-Processing Error Correction Algorithm Using Google Online Spelling Suggestion." ArXiv.org, 2012, pp. arXiv.org, 2012. 2012.

Benalcazar, Daniel, et al. "Synthetic ID Card Image Generation for Improving Presentation Attack Detection." IEEE Transactions on Information Forensics and Security, vol. 18, 2023, pp. 1814-1824. 2023.

Casado, Constantino Alvarez, et al. "Real-time Face Alignment: Evaluation Methods, Training Strategies and Implementation Optimization." Journal of Real-time Image Processing 18.6 (2021): 2239-2267. Web. 2021.

Deepswap.AI, "Deepswap—Best Face and Video Edit Tools Online." DeepSwap AI, www.deepswap.ai/?utm_source=bing&cp_id=441169896&msclkid=eb76125c4d531cf9797e77325a694067. Accessed Dec. 2023. Web. 11 pgs. 2023.

Devcodef1 Editors, Using LLMS for OCR text proofreading: A guide for software developers. Dev Code F1. May 26, 2023, <https://devcodef1.com/news/1007434/llms-for-ocr-text-proofreading> Web. 3 pgs. 2023.

Faceshape. "Face Morphing Simulator—Morph Two Faces Together." Face Morphing Simulator—Morph Two Faces Together, www.faceshape.com/face-morph. (2022) Web. 2 pgs. 2022.

Fadilpaič, Sead. "Deepfake Fraud Attacks Are Hitting More and More Businesses." TechRadar, TechRadar Pro, Feb. 24, 2023, www.techradar.com/news/deepfake-fraud-attacks-are-hitting-more-and-more-businesses. Accessed Jan. 12, 2024. Web. 8 pgs. 2023.

Github, Use Llama2 to Improve the Accuracy of Tesseract OCR. GitHub. (n.d.). https://github.com/Dicklesworthstone/llama2_aided_tesseract> Web. Last updated Aug. 2, 2023. 3 pgs. 2023.

Help Net Security. "Detecting Face Morphing: A Simple Guide to Countering Complex Identity Fraud." Help Net Security, Mar. 16, 2023, www.helpnetsecurity.com/2023/03/20/facial-morphing-technology/. Web. 5 pgs. 2023.

Hu, Yifei, et al. "Misspelling Correction with Pre-Trained Contextual Language Model." ArXiv.org, 2021, pp. arXiv.org, 2021. 2021.

Kaspersky, Secure Futures Editors. "What Does the Rise of Deepfakes Means for the Future of Cybersecurity?" Daily English USA Usakasperskycomblog, Kaspersky Secure Futures Editors, usa.kaspersky.com/blog/secure-futures-magazine/deepfakes-2019/21932/.

Kramer, Robin S. S., et al. "Face Morphing Attacks: Investigating Detection with Humans and Computers." Cognitive Research: Principles and Implications, vol. 4, No. 1, 2019, p. 28. 2019.

Kumar, Varun. "14 Best Deepfake Apps and Tools in 2024." RankRed, Jan. 1, 2024, www.rankred.com/best-deepfake-apps-tools/. Web. 22 pgs. 2024.

Lee, Jung-Hun, et al. "Deep Learning-Based Context-Sensitive Spelling Typing Error Correction." IEEE Access, vol. 8, 2020, pp. 152565-152578. 2020.

(56) References Cited

OTHER PUBLICATIONS

Liu, Zhaoxiang, et al. "Facial Pose Estimation by Deep Learning from Label Distributions." (2019). Web. IEEE/CVF International Conference on Computer Vision Workshop (ICCVW), 9 pgs. 2019.
Lowphansirkul, Lalita, et al. "WangchanBERTa: Pretraining Transformer-Based Thai Language Models." ArXiv.org, 2021, pp. arXiv.org, 2021. 2021.
Luo, Yinhui et al. "A Review of Homography Estimation: Advances and Challenges." Electronics 2023 pp. 4977-4977. https://www.mdpi.com/2079-9292/12/24/4977 2023.
Lyu, Siwei, "Detecting 'deepfake' Videos in the Blink of an Eye." The Conversation, Sep. 15, 2022, theconversation.com/detecting-deepfake-videos-in-the-blink-of-an-eye-101072. Web. 4 pgs. 2022.
Mazaheri, Ghazal et al. "2022 Ieee/Cvf Winter Conference on Applications of Computer Vision (Wacv)." Detection and Localization of Facial Expression Manipulations IEEE 2022 pp. 2773-2783 2022.
Nightingale, Sophie J., et al. "Perceptual and Computational Detection of Face Morphing." Journal of Vision (Charlottesville, Va.), vol. 21, No. 3, 2021, p. 4. 2021.
Picsi.AI, "Create Realistic Face Morphs" Picsi.AI, InsightFace, 2023, www.picsi.ai/. Web. 8 pgs. 2023.
Rosebrock, A. (Nov. 16, 2021). OCR passports with opencv and Tesseract. PyImageSearch. <https://pyimagesearch.com/2021/12/01/ocr-passports-with-opencv-and-tesseract/> Web. 24 pgs. 2021.
Sadeghzadeh, Arezoo, et al., "Pose-invariant face recognition based on matching the occlusion free regions aligned by 3D generic model." IET Computer Vision, Aug. 2020, vol. 14, Issue 5, pp. 177-287. 2020.
Schulz, Daniel, et al., "Identify Documents Image Quality Assessment." European Association for Signal Processing, Proceedings 2022 pp. 1017-1021. 2022.
Seibold, C., et al., "Detection of Face Morphing Attacks by Deep Learning." Digital Forensics and Watermarking. IWDW (2017). Lecture Notes in Computer Science(), vol. 10431. Springer, Cham. https://doi.org/10.1007/978-3-319-64185-0_9 2017.
Tesseract-OCR, Improving the Quality of the Output Github.com, Tesseract User Manual v. 5.x, 9 pgs, updated Dec. 5, 2023. Web. 2023.
Times, Global. "Tencent Launches Large Language Model 'Hunyuan' amid Global Generative Ai Frenzy." Global Times, Sep. 7, 2023, www.globaltimes.cn/page/202309/1297761.shtml. 6 pgs. 2023.
Youtube, YouTube, "Morphing Identity: A real-time face morphing system to transforming face identity." May 15, 2021, Cybernetic Humanity Studio. https://youtu.be/ahKxwaJ3k_U?si=kp4G4wFa8IAsGNLY 2021.
Zhao, Jian et al. "2018 Ieee/Cvf Conference on Computer Vision and Pattern Recognition." Towards Pose Invariant Face Recognition in the Wild IEEE 2018 pp. 2207-2216. 2018.
PCT International Search Report and Written Opinion; Application No. PCT/US23/79511 Jumio Corporation, International filing date of Nov. 13, 2023, date of mailing Mar. 4, 2024, 17 pages.
Aslam, Asra, et al., May 15, 2019, Depth-Map Generation using Pixel Matching in Stereoscopic Pair of Images, https://arxiv.org/pdf/1902.03471.pdf, 5 pgs.
Canada Passport Phot Security Features, Canada.ca, Government of Canada (Dec. 20, 2022) https://www.canada.ca/en/immigration-refugees-citizenship/services/canadian-passports/photos.html#photo, webpage 11 pgs.
Edge Detection Using OpenCV, LearnOpenCV.com, (2023) https://learnopencv.com/edge-detection-using-opencv/, webpage. 10 pgs.
Elsayed, M et al. "A New Method for Full Reference Image Blur Measure." International Journal of Simulation: Systems Science and Technology V19 N1 (Feb. 1, 2018): 7.1-7.5 2018 https://doi.org/10.5013/IJSSST.a.19.01.7.
Passport Photo Specifications., Government of Canada (2015) https://www.canada.ca/content/dam/ircc/migration/ircc/english/pdf/pub/pass-photo-spec-eng.pdf, 5 pgs.
Rosebrock, Adrian, "OpenCV Fast Fourier Transform (FFT) for blur detection in images and video streams." PyImageSearch.com, Jun. 15, 2020, webpage, 21 pgs. https://pyimagesearch.com/2020/06/15/opencv-fast-fourier-transform-fft-for-blur-detection-in-images-and-video-streams/.
Rosebrock, Adrian, Blur Detection with OpenCV PyImageSearch.com, Sep. 7, 2015, https://pyimagesearch.com/2015/09/07/blur-detection-with-opencv/, webpage, 13 pgs.
Shokat, Sana, et al. "Analysis and Evaluation of Braille to Text Conversion Methods." Mobile Information Systems, vol. 2020, 2020, pp. 1-14.
Shokat, Sana, et al. "Characterization of English Braille Patterns Using Automated Tools and RICA Based Feature Extraction Methods." Sensors (Basel, Switzerland), vol. 22, No. 5, 2022, p. 1836.
PCT International Search Report and Written Opinion; Application No. PCT/US23/79821 Jumio Corporation, International filing date of Nov. 15, 2023, date of mailing Apr. 4, 2024, 10 pages.
Di Guardo, Fabrizio. "Facemask—a Real-Time Face Morphing Tool." Medium, Level Up Coding, May 2, 2023, levelup.gitconnected.com/facemask-a-real-time-face-morphing-tool-5b343591a237. May 2, 2023.
"Face Landmark Detection Guide | Google Ai Edge | Google AI for Developers." Google, ai.google.dev/edge/mediapipe/solutions/vision/face_landmarker.
"Image Segmentation Guide | Google Ai Edge | Google AI for Developers." Google, ai.google.dev/edge/mediapipe/solutions/vision/image_segmenter.
Kirillov, Alexander et al. "Segment Anything." 2023 IEEE/CVF International Conference on Computer Vision (ICCV), Oct. 1, 2023, doi:10.1109/iccv51070.2023.00371. Oct. 1, 2023.
"Large Language and Vision Assistant." LLaVA, llava-vl.github.io/.
Liu, Haotian, et al. "Visual Instruction Tuning." 37th Conference on Neural Information Processing Systems, Dec. 11, 2023, arxiv.org/pdf/2304.08485. Dec. 11, 2023.
"Llava 1.6—a Hugging Face Space by Liuhaotian." LLaVA 1.6—a Hugging Face Space by Liuhaotian, huggingface.co/spaces/liuhaotian/LLaVA-1.6.
Wang, Xin, et al. "Attribute-Aware Implicit Modality Alignment for Text Attribute Person Search." Arxiv.Org, Jun. 6, 2024. Jun. 6, 2024.
Wang, Zhe, et al. "Attribute-guided Transformer for Robust Person Re-identification." IET Computer Vision, vol. 17, No. 8, Jun. 23, 2023, pp. 977-992, doi:10.1049/cvi2. 12215. Jun. 23, 2023.
PCT International Search Report and Written Opinion; Application No. PCT/US23/86219 Jumio Corporation, International filing date of Dec. 28, 2023, date of mailing May 23, 2024, 4 pages.
PCT International Search Report and Written Opinion; Application No. PCT/US2024/048525 Jumio Corporation, International filing date of Sep. 26, 2024, date of mailing Nov. 27, 2024, 10 pages. 2024.

* cited by examiner

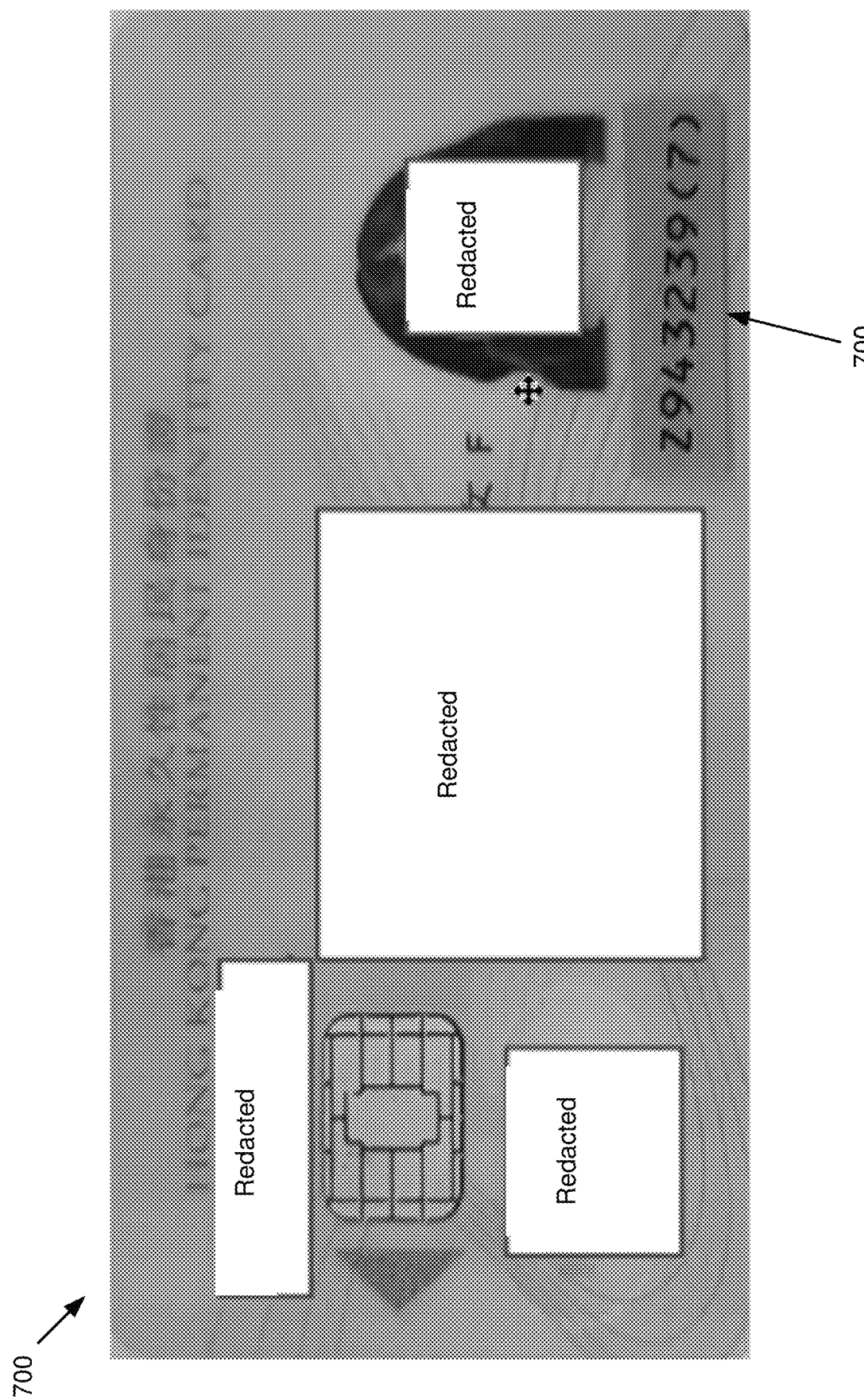

DOCUMENT BOUNDARY ANALYSIS

CROSS-REFERENCE TO RELATED APPLICATIONS

The present application is a continuation-in-part of U.S. patent application Ser. No. 18/193,732, titled "Evaluating Three-Dimensional Security Features on Document Images," and filed Mar. 31, 2023. U.S. patent application Ser. No. 18/193,732, titled "Evaluating Three-Dimensional Security Features on Document Images," and filed Mar. 31, 2023, is a continuation-in-part of U.S. patent application Ser. No. 18/148,544, titled "Document Database," and filed on Dec. 30, 2022; a continuation-in-part of U.S. patent application Ser. No. 18/148,542, titled "Document Assembly Object Generation," and filed on Dec. 30, 2022; and a continuation-in-part of U.S. patent application Ser. No. 18/148,536, titled "Document Evaluation Based on Bounding Boxes," and filed on Dec. 30, 2022, the contents of all of the foregoing are hereby incorporated by reference in their entirety.

The present application is a continuation-in-part of U.S. patent application Ser. No. 18/193,736, titled "Document Blur Assessment," and filed Mar. 31, 2023. U.S. patent application Ser. No. 18/193,736, titled "Document Blur Assessment," and filed Mar. 31, 2023, is a continuation-in-part of U.S. patent application Ser. No. 18/148,544, titled "Document Database," and filed on Dec. 30, 2022; a continuation-in-part of U.S. patent application Ser. No. 18/148,542, titled "Document Assembly Object Generation," and filed on Dec. 30, 2022; and a continuation-in-part of U.S. patent application Ser. No. 18/148,536, titled "Document Evaluation Based on Bounding Boxes," and filed on Dec. 30, 2022, the contents of all of the foregoing are hereby incorporated by reference in their entirety.

The present application is a continuation-in-part of U.S. patent application Ser. No. 18/193,669, titled "Generating a Document Assembly Object and Derived Checks," and filed Mar. 31, 2023. U.S. patent application Ser. No. 18/193,669, titled "Generating a Document Assembly Object and Derived Checks," and filed Mar. 31, 2023, is a continuation-in-part of U.S. patent application Ser. No. 18/148,544, titled "Document Database," and filed on Dec. 30, 2022; a continuation-in-part of U.S. patent application Ser. No. 18/148,542, titled "Document Assembly Object Generation," and filed on Dec. 30, 2022; and a continuation-in-part of U.S. patent application Ser. No. 18/148,536, titled "Document Evaluation Based on Bounding Boxes," and filed on Dec. 30, 2022, the contents of all of the foregoing are hereby incorporated by reference in their entirety.

The present application is a continuation-in-part of U.S. patent application Ser. No. 18/193,675, titled "Document Checks Based on Document Holder Image," and filed Mar. 31, 2023. U.S. patent application Ser. No. 193,675, titled "Document Checks Based on Document Holder Image," and filed Mar. 31, 2023, is a continuation-in-part of U.S. patent application Ser. No. 18/148,544, titled "Document Database," and filed on Dec. 30, 2022; a continuation-in-part of U.S. patent application Ser. No. 18/148,542, titled "Document Assembly Object Generation," and filed on Dec. 30, 2022; and a continuation-in-part of U.S. patent application Ser. No. 18/148,536, titled "Document Evaluation Based on Bounding Boxes," and filed on Dec. 30, 2022, the contents of all of the foregoing are hereby incorporated by reference in their entirety.

BACKGROUND

The present disclosure relates to document verification. More specifically, the present disclosure relates to confirming the authenticity of a document.

Documents are provided in many contexts. For example, documents may be provided in order to prove a person's age or identity, as is the case with identification documents, as proof ownership, as is the case with documents such as title documents, as proof of authenticity (e.g., a certificate of authenticity), as proof of address, etc. Those contexts may have significant, financial, legal, or safety implications.

SUMMARY

This specification relates to methods and systems for obtaining, using one or more processors, at least one image of a document under test; obtaining, using the one or more processors, an edge domain representation of a first portion of the document under test; comparing, using the one or more processors, the edge domain representation of the first portion of the document under test to an edge domain representation of a corresponding portion of one or more valid document instances; and modifying, using one or more processors, a likelihood that the document under test is accepted as valid, or rejected as invalid, based on the comparison of the edge domain representations associated with the document under test and corresponding portion associated with one or more valid document instances.

Other implementations of one or more of these aspects include corresponding systems, apparatus, and computer programs, configured to perform the actions of the methods, encoded on computer storage devices.

These and other implementations may each optionally include one or more of the following features. For instance, the features further include where obtaining the edge domain representation includes applying one or more of Prewitt edge detection, a Sobel edge detection, a Laplacian edge detection, Robert edge detection, and canny edge detection. For instance, the features further include comparing the edge domain representation of the first portion of the document under test to the edge domain representation of the corresponding portion of one or more valid document instances identifies one or more of an absence of an expected edge, a presence of an unexpected edge, and a discontinuity of an expected edge. For instance, the features further include comparing the edge domain representation of the first portion of the document under test to an edge domain representation of a corresponding portion of one or more valid document instances may include: identifying a boundary in the edge domain representation of the corresponding portion of one or more valid document instances; and determining whether an edge associated with the boundary in the edge domain representation of the one or more valid document instances is may include with an edge in the edge domain representation of the first portion of the document under test. For instance, the features further include that the boundary is based on a security feature and defines the first portion of the document where the security feature is present in the one or more valid document instances. For instance, the features further include that the boundary is associated with one or more of a bounding box, a field label, a field, text, an image, a document holder image, a ghost image, a watermark, a hologram, a silhouette, and a seal. For instance, the features further include that the edge associated with the boundary in the edge domain representation of the one or more valid document instances one or more of crosses the boundary or stops at the boundary. For instance, the features further include that the corresponding portion of one or more valid document instances includes microprint that may be obscured obstructed by document instance specific information, and where comparing the edge domain representation of the first portion of the document under test to an edge domain representation of a corresponding portion of one or more valid document instances may include: identifying, in the edge domain representation of the first portion of the document under test, a set of edges associated with the document instance specific information specific to the document under test; and ignoring, in the comparison of the edge domain representation of the first portion of the document under test to the edge domain representation of the corresponding portion of one or more valid document instances, one or more portions enclosed by the set of edges associated with the document specific information specific to the document under test. For instance, the features further include that the set of edges associated with the document instance specific information represent a silhouette of a document holder in a document holder image, and the comparison determines whether one or more of an edge associated with microprint is present in a background of the document image holder and whether the edge associated with the microprint extends to the silhouette of the document holder image in the document under test. For instance, the features further include that the set of edges associated with the document specific information specific to the document under test represents a silhouette of the a document holder in a document holder image, the method may include: obtaining an edge domain representation of a second portion of the document under test, the second portion of the document under test including, in valid instances, a ghost image of the document holder's image; comparing a set of edges representing a silhouette from the ghost image to the set of edges representing the silhouette in the document holder image; and determining, based on the comparison, whether a match between the silhouette from the ghost image and the silhouette in the document holder image exists.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 is an image of an example of a fraudulent image of a Hong Kong Permanent Identity Card in accordance with some implementations.

DETAILED DESCRIPTION

The present disclosure is described in the context of an example document evaluator and use cases; however, those skilled in the art should recognize that the document evaluator may be applied to other environments and use cases without departing from the disclosure herein.

Documents are provided in many contexts. For example, documents may be provided in order to prove a person's age or identity, as is the case with identification documents, as proof ownership, as is the case with documents such as title documents, as proof of authenticity (e.g., a certificate of authenticity), etc. Those contexts may have significant, financial, legal, or safety implications. For example, documents may be provided to confirm an identity of a user prior to a financial transaction. If an invalid document is accepted and used for identification, identity theft, circumvention of sanctions, watchlists, or anti-money laundering mechanisms may occur.

Accordingly, it is desirable to verify a document, particularly before that document is relied upon. For example, before the document is relied upon as a reference for a comparison between an attribute (e.g., a biometric such as a signature, voice, face, retina, palm print, fingerprint, etc.) of a person present and the document.

A user wishing to establish his/her identity with an entity, e.g., a government agency or a commercial enterprise, may be asked to submit an image of a document through the entity's application on his/her mobile phone or through the entity's portal on a web browser. The entity may, depending on the implementation, request verification of the document by the document evaluation systems and methods described herein.

Fraudsters may leverage technology to automate a series of repeated, fraudulent attempts to mislead an entity until a successful vector of attack is discovered, and their attacks may become increasingly more sophisticated (e.g., using photo editing software, such as Photoshop to modify images of valid documents to create fake/invalid documents, such as fake IDs). Although, attacks may be less sophisticated, such as printing false information on semi-transparent paper and overlaying that semi-transparent paper over the portion of another document. The document evaluator 226 described herein may beneficially detect fraudulent documents including those using the foregoing methods of attack.

Figure 1:
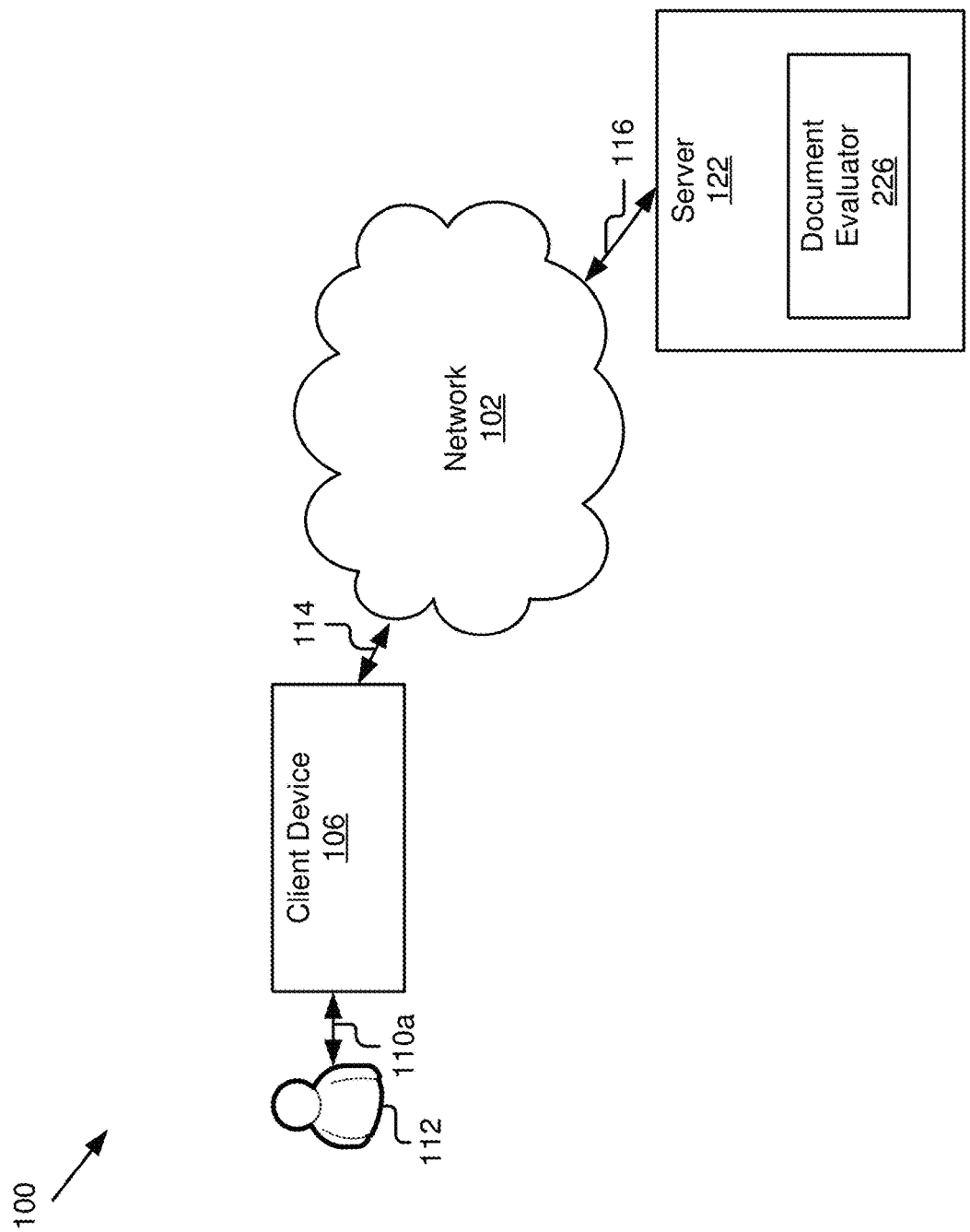
FIG. 1 is a block diagram of one example implementation of a system for document evaluation in accordance with some implementations.

FIG. 1 is a block diagram of an example system 100 for document evaluation in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although a single client device 106 is shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit). The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality described herein may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the server 122 include an instance of the document evaluator 226. However, in some implementations, the components and functionality of the document evaluator 226 may be entirely client-side (e.g., at client device 106; not shown), entirely server side (i.e., at server 122, as shown), or divide among the client device 106 and server 122.

Figure 2:
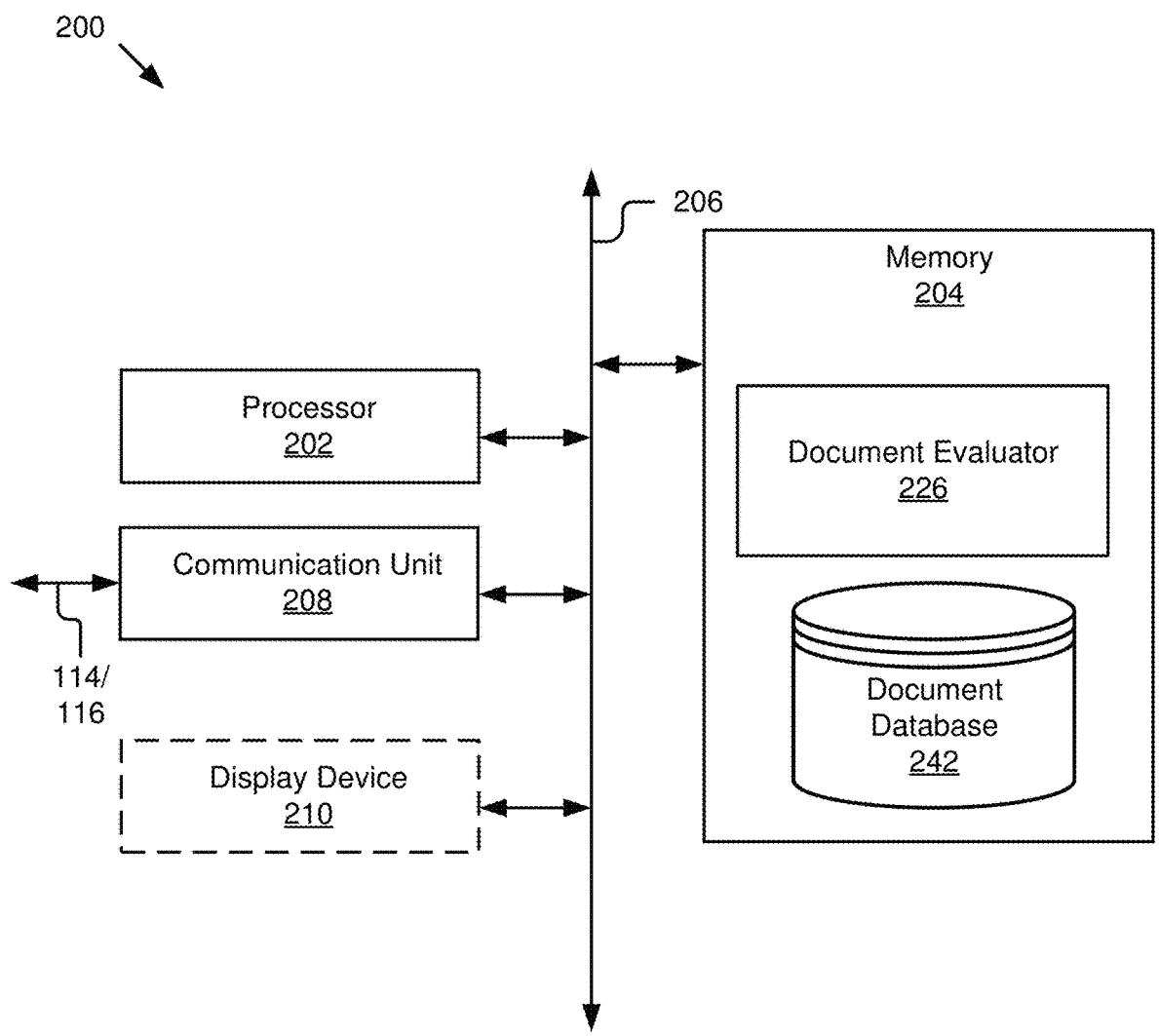
FIG. 2 is a block diagram of an example computing device in accordance with some implementations.

FIG. 2 is a block diagram of an example computing device 200 including an instance of the document evaluator 226. In the illustrated example, the computing device 200 includes a processor 202, a memory 204, a communication unit 208, an optional display device 210, and a data storage 214. In some implementations, the computing device 200 is a server 122, the memory 204 stores the document evaluator 226, and the communication unit 208 is communicatively coupled to the network 102 via signal line 116. In some implementations, the computing device 200 is a client device 106, which may occasionally be referred to herein as a user device, and the client device 106 optionally includes at least one sensor (not shown), and the communication unit 208 is communicatively coupled to the network 102 via signal line 114.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the document evaluator 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations. In some implementations, the memory 204 stores a document database 242. In some implementations, the document database 242 is stored on a portion of the memory 204 comprising a network accessible storage device.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 218 is a conventional type such as a liquid crystal display (LCD), light emitting diode (LED), touchscreen, or any other similarly equipped display device, screen, or monitor. The display 218 represents any device equipped to display electronic images and data as described herein. In some implementations, the display device 218 is optional and may be omitted.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure.

In some implementations, the document evaluator 226 provides the features and functionalities described below responsive to a request. For example, a request on behalf of an entity (not shown) to evaluate an image of a document. In some implementations, the evaluation of the document determines whether the document is accepted (e.g., determined to be valid) or rejected (e.g., invalid, abused, modified, fraudulent, etc.).

Figure 3:
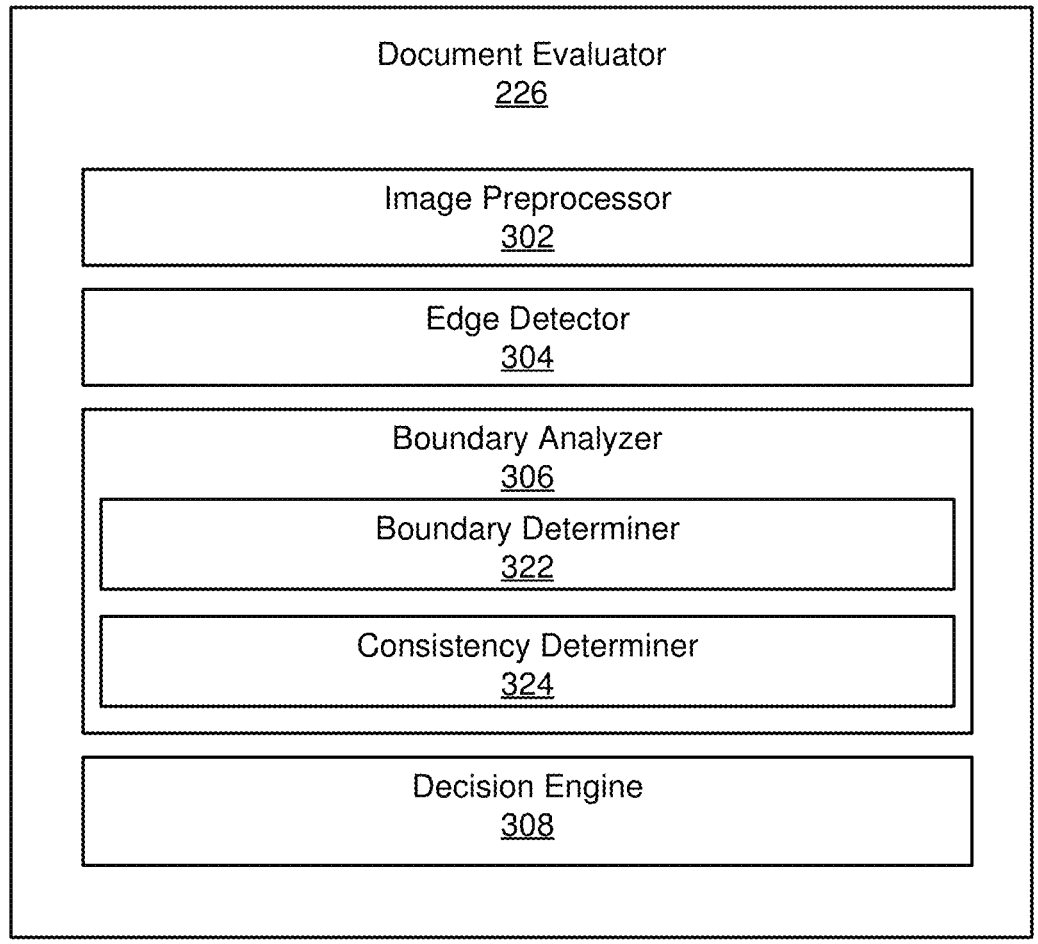
FIG. 3 is a block diagram of an example document evaluator in accordance with some implementations.

Referring now to FIG. 3, a block diagram of an example document evaluator 226 is illustrated in accordance with one implementation. As illustrated in FIG. 3, in some implementations, the document evaluator 226 may include an image preprocessor 302, an edge detector 304, a boundary analyzer 306, and a decision engine 308. The components 302, 304, 306, 308, and subcomponents thereof may be communicatively coupled to one another and/or to the document database 242 to perform the features and functionalities described herein.

In some implementations, the image preprocessor 302 receives one or more images representing a document, also referred to occasionally as an image of a document or document image and preprocesses the one or more document images to generate a set of post-processed images of the document for subsequent use by one or more of the other components of the document evaluator 226. The image preprocessor 302 is communicatively coupled to receive the one or more document images (e.g., from a camera sensor on the client device 106 via a web browser, mobile application, or API and the network 102).

The preprocessing performed by the image preprocessor 302, and accordingly the set of post-processed images generated, may vary depending on the implementation and use case. Examples of preprocessing performed by the image preprocessor 302 may include one or more of document extraction, rectification, composite image generation, etc. In some implementations, the image preprocessor 302 may extract the portion of the image depicting the document (e.g., from the background or surrounding environment). In some implementations, the image preprocessor 302 may rectify the image data, or a portion thereof, by performing one or more of a rotation, a translation, and a de-skew. For example, in some implementations, the image preprocessor 302 determines the polygon associated with a document portion within the image and rotates and de-skews the polygon, e.g., to generate a normalized, rectangular representation of the document.

In some implementations, the image preprocessor 302 may receive multiple images of the same document instance (e.g., multiple frames from a video clip recording an identification document) and generate a composite image based on the multiple images. For example, some documents, such as government issued identification documents, may have optically dynamic security features such as color shifting ink, hologram, kinegrams, etc., which may not be represented in a single image or different portions of the document may be obstructed and unobstructed in different images. In some implementations, the image preprocessor 302 may make a composite document image that represents the optically dynamic security feature, when present, so that the document evaluator 226 may use those optically dynamic security features, or their absence, in the evaluation. In some implementations, the image preprocessor 302 may perform other image processing on a document image or snippet(s) thereof.

In some implementations, a subset of the preprocessing performed by the image preprocessor 302 may be conditional based on a classification of the document. In some implementations, the image preprocessor 302 communicates the set of one or more post-processed images to, or stores (e.g., in the document database 242), the set of post processed document images for retrieval by one or more subcomponents of the document evaluator. In some implementations, the features and functionalities of one or more of the document edge detector 304, the boundary analyzer 306, and the decision engine 308 described below with reference to a valid sample, or image under test, document image, or edge domain version of the foregoing are based on a post-processed version(s) of the referenced document image.

Figure 4:
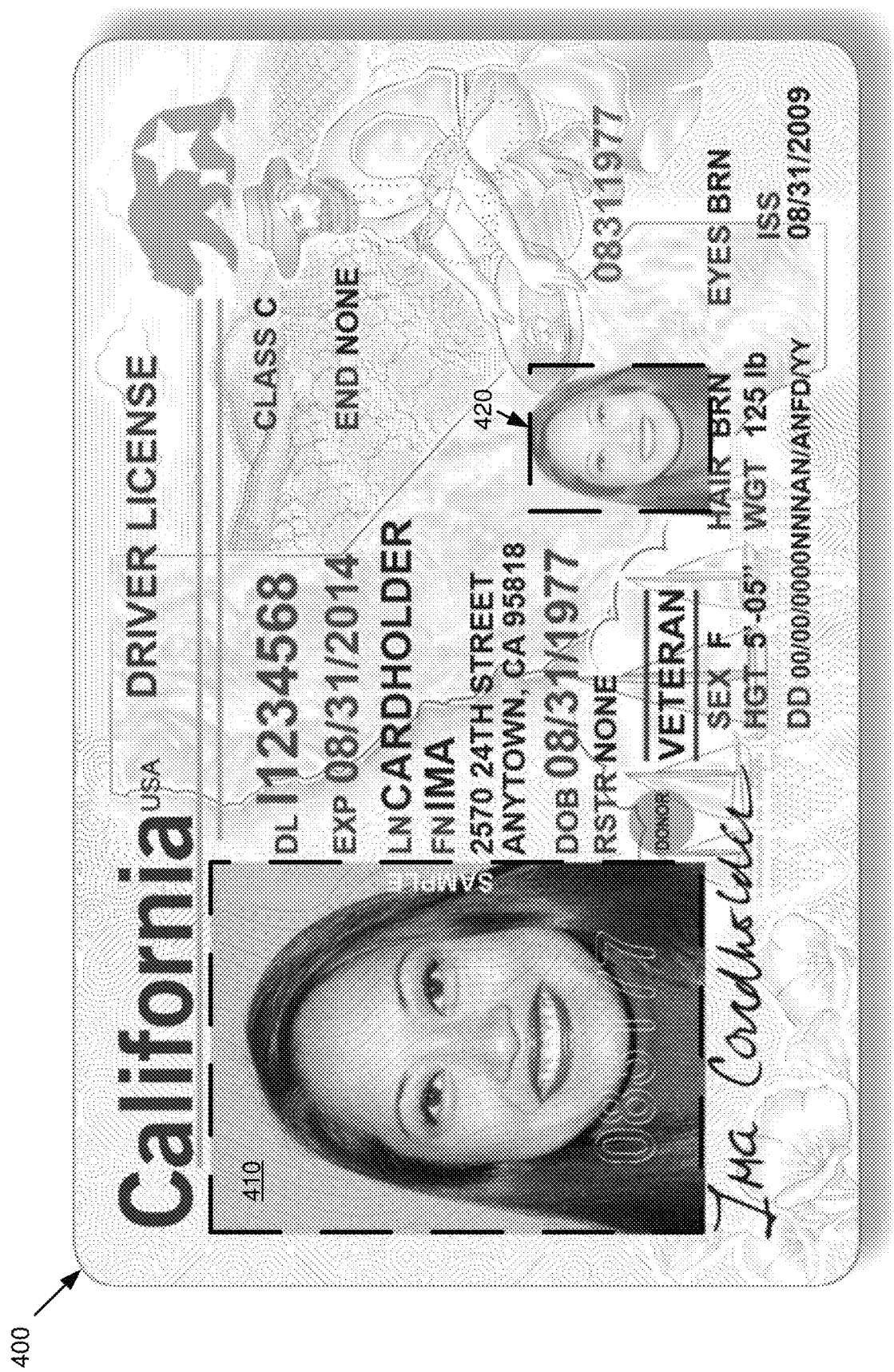
FIG. 4 is an image of an example of a California Driver's License, which is an example document in accordance with some implementations.

For clarity and convenience, the description herein refers to a number of example documents. However, it should be understood that these examples have been selected for ease of explanation and the scope of the description is not limited to the provided examples. Assume that a user has submitted an image of a California Driver's License. In some implementations, the image preprocessor 302 may rectify a received document image, remove the document's surroundings from the user-captured input image, and obtain the example the California Driver's License (CADL) 400, which is an example document, as illustrated in FIG. 4.

The image preprocessor 302 is communicatively coupled with other components of the document evaluator 226 to make post-processed images available thereto. For example, the image processor 302 is communicatively coupled to the document database 242 to store a post processed image for retrieval by the edge detector 304. As another example, the image processor 302 is communicatively coupled to the edge detector 304 to send a post-processed image.

In some implementations, the edge detector 304 performs one or more edge detections on at least a portion of a document image. Examples of edge detection methods include, but are not limited to Prewitt edge detection, a Sobel edge detection, a Laplacian edge detection, Robert edge detection, Canny edge detection, etc. For example, in some implementations, the edge detector 304 performs a Canny edge detection on the CADL 400 image of FIG. 4 and generates the edge domain document image CADL 500 of FIG. 5. As another example, in some implementations, the edge detector 304 performs a Canny edge detection on the document holder image portion 410 of CADL and ghost image portion 420 of CADL 400 and generates edge domain representations of those portions as illustrated by portions 610 and 620, respectively, in FIG. 6. In other words, the edge detector 304, by performing an edge detection, may generate a version of the input image (e.g., a post-processed image or portion thereof) that is converted into the edge-domain, this output may occasionally be referred to herein as an "edge domain representation" of the image or similar.

In some implementations, the edge detector 304 performs one or more edge detections associated with a set of valid document instances and a document under test. The edge domain representations of the one or more valid instances may be used, e.g., by the boundary analyzer 306 described below, to evaluate an edge domain representation generated by the edge detector 304 associated with a document image under test. In some implementations, the edge detector 304 may generate a composite edge domain representation of a valid instance based on multiple valid instances. For example, the edge detector 304 generates an edge domain representation of each of a plurality of valid document instances and generates a composite that represents, e.g., a complete or near complete microprint template in the edge domain.

The one or more edge detections applied by the edge detector 304 may vary based on one or more criteria. The one or more criteria may include one or more of the imaged document, the imaged document's security features, a customer preference, and a risk. For example, the different types or versions of documents may have a different edge detection applied or a different set of edge detections applied. As another example, different edge detections may be more accurate for detecting edges in different security features (e.g., a first edge detector may be more accurate or computationally efficient at detecting edges associated with document perforations, while a second edge detection method may be more accurate or computationally efficient at detecting edges associated with facial features in a document holder image 410 or ghost image 420, and a third edge detection method may be more accurate or computationally efficient at detecting edges associated with text). As another example, different customers may have a preference with regard to one or more of false positives, false negatives, cost per document authentication, allotted computational resources, time allotted for a document authentication decision to be made, etc. that may affect the number and/or type of edge detections applied by the edge detector 304 and subsequently used by the document evaluator 226 or its subcomponents. As another example, a "riskier" document (e.g., the document type is favored by fraudsters, the document is being submitted through a user or channel associated with documents previously identified as inauthentic, the document instance failed another, earlier, or preliminary evaluation, applied by the document evaluator, etc.) may have more, or different, edge detections so that the document evaluator 226 may, in effect, apply more scrutiny to the imaged document instance. In some implementations, one or more of the imaged documents, the imaged document's security features, and a risk may be based on a classification model (not shown) trained, validated, and applied by the document evaluator 226 to classify imaged documents so that checks associated with that document and its security features may be evaluated.

In some implementations, an edge detection method may include one or more parameters that affect the outcome of the edge detection. For example, when applying a Canny edge detection, the edge detector 304 may, as part of the Canny edge detection method, apply a Gaussian blur to reduce the amount of noise and later in the method apply a double threshold. A different sigma value in the Gaussian blur and/or a different double threshold may result in different sets of edges being detected in the same document or portion thereof. For example, one set of parameters may detect finer edges in the microprint or a face than another set of parameters. It should be recognized that the preceding examples of sigma and double threshold are a non-exhaustive set of examples in relation to Canny edge detection and that other parameters exist in relation to Canny edge detection and in relation to other edge detection methods, and those other parameters are within the scope of this disclosure.

In some implementations, the edge detection parameters may vary from document-to-document, from document portion-to-document portion, within a document portion, or a combination thereof. For example, in some implementations, the edge detector 304 may vary one or more parameters based on a class of the imaged document so that, for instance, a document with fine microprint in the background, such as the CADL 400, may have a different set of parameters applied to it than to a document with larger microprint features in order to detect the finer edges present in microprint).

Figure 6:
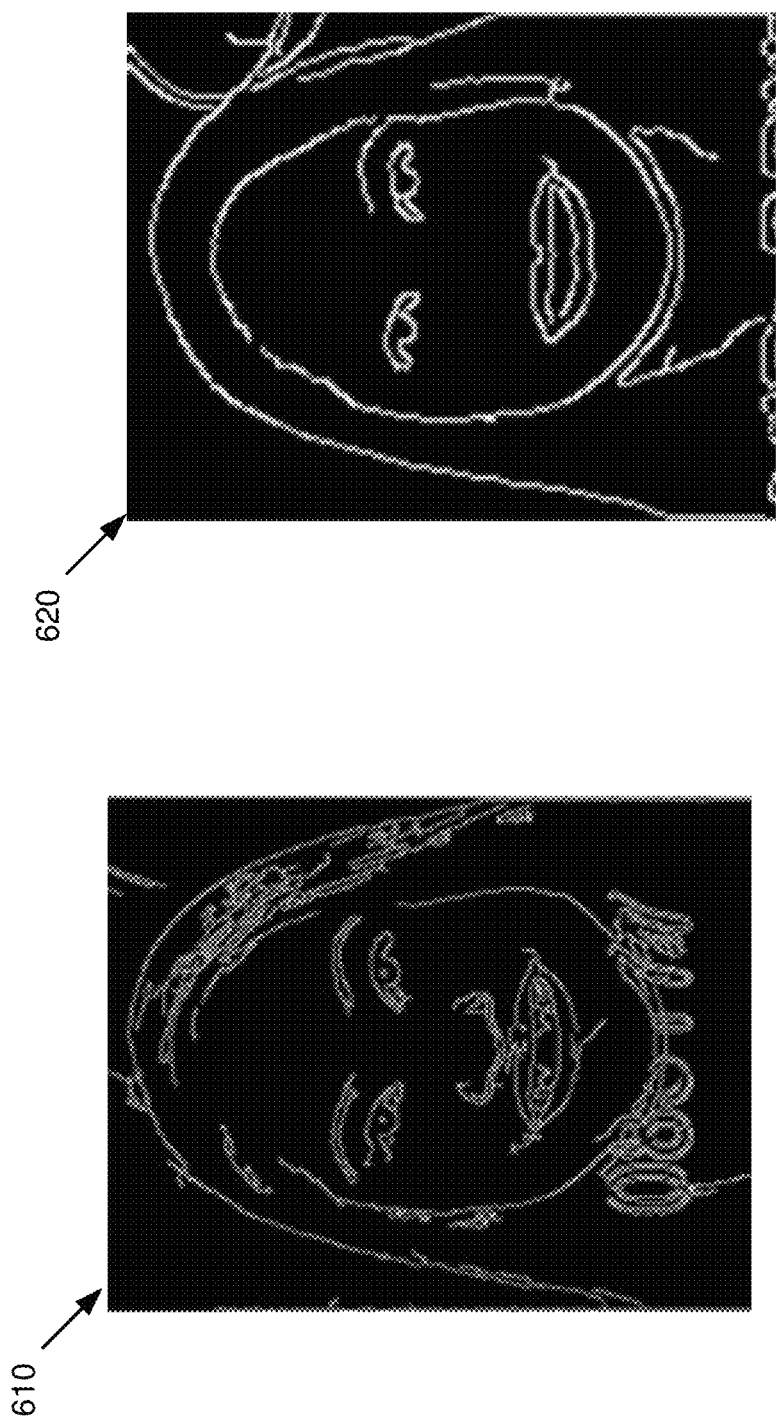
FIG. 6 illustrates magnified examples of the edge domain representations of portions of the California Driver's License in accordance with some implementations.

As another example, in some implementations, the edge detector 304 may vary one or more parameters based the portion of the document in which the edges are being detected so that, for instance, one set of parameters is applied to the document holder's facial image 410 and another set of parameters to the ghost image 420. For example, assume that the edge domain representations of the document holder image portion 610 and the ghost image portion 620 of FIG. 6 are generated using a first set of parameters. Portion 620, based on the ghost image, has fewer edges associated with facial features. Specifically, portion 620 includes edges associated with the eyes, lips and one eyebrow, but lacks edges associated with, e.g., the nose. In some implementations, the boundary analyzer 306 may compare these two portions, as illustrated. In some implementations, the edge detector 304 may apply different parameters (e.g., to reduce the facial feature edges in the portion associated with the document image holder and/or increase the edges detected in association with facial features in the ghost image portion.

As another example, in some implementations, the edge detector 304 may perform multiple edge detections using different parameters to the same portion of a document, so that, for instance, multiple Canny edge detections with different parameters are applied by the edge detector 304 to the document holder's facial image 410, which may capture edges associated with facial features and/or microprint background in different levels of detail. For example, a less granular set of edges associated with the document holder's silhouette, which may be compared to the set of edges illustrated in portion 620 to evaluate whether the face in the ghost image and document holder image are consistent, and a more granular set of images than illustrated in 610, which may capture more of the microprinted dots and wavey lines overlaying the document holder image 410.

In some implementations, one or more of the edge detection(s) and parameter(s) used may vary dynamically. For example, the edge detector 304 the parameters may be modified by customer preference or optimized for accuracy and/or computational efficiency. In some implementations, one or more of the parameters may be optimized using machine learning, e.g., using a champion and challenger model to determine one or more of the parameters.

In some implementations, the one or more edge detections applied may vary based on one or more of a use case. For example, the number and type of edge detections may vary, in some implementations, based on one or more of: a class of the document in the image (e.g., driver's license vs passport, or UK passport vs Canadian passport, etc.), a preference of a customer requesting authentication of the document, a level of scrutiny to which the document is being subjected (e.g., the analysis may be successively more stringent and/or higher risk documents may be subjected to different or a different number of edge detections), computational resources availability and/or their related cost, etc.

Figure 5:
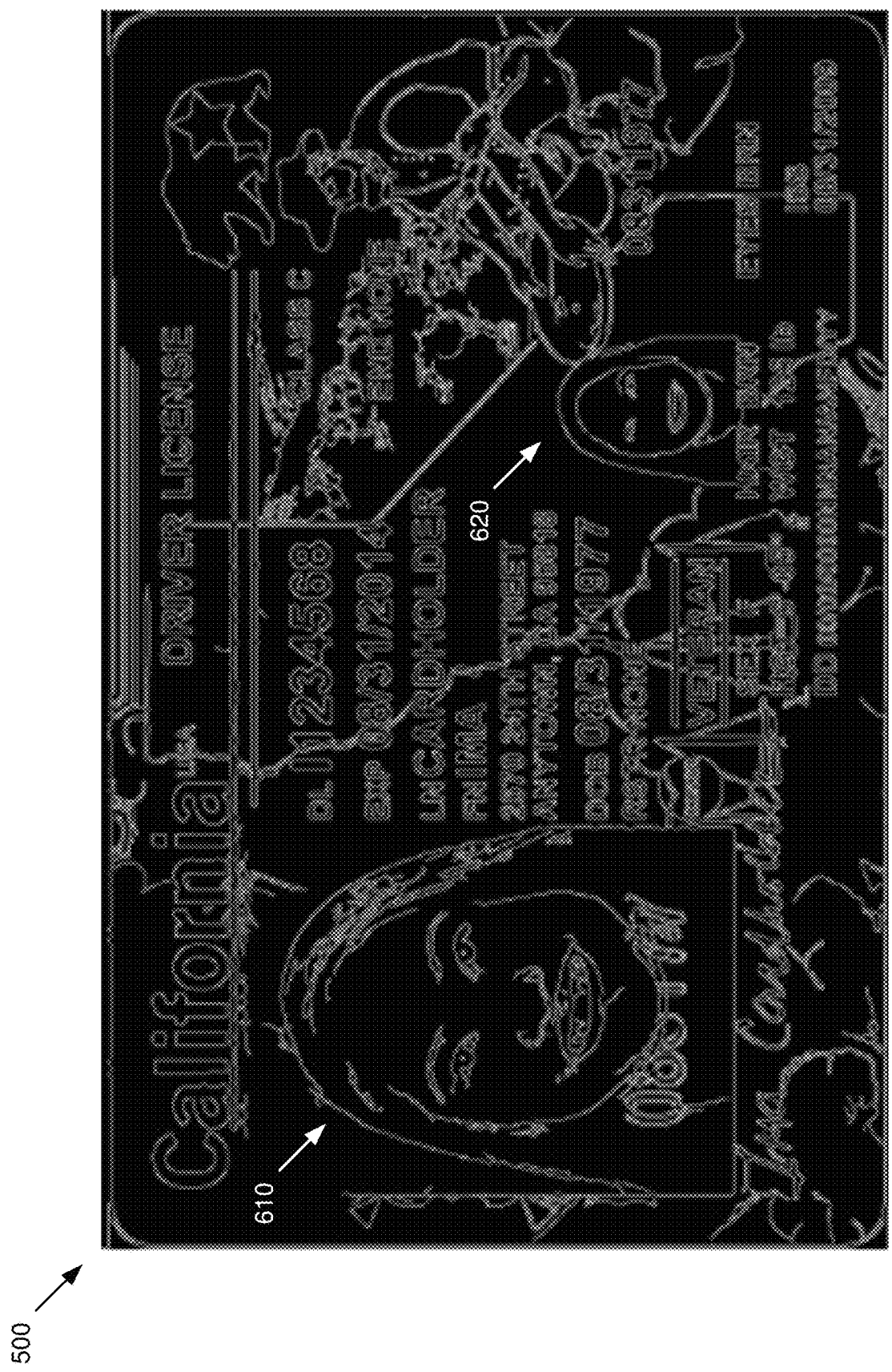
FIG. 5 illustrates an example of an edge domain representation of the California Driver's License in accordance with some implementations.

In some implementations, the portion(s) of the document image to which the edge detector 304 applies edge detection may vary. For example, in some implementations, the edge detector 304 may apply edge detection to the entirety of the document as illustrated in FIG. 5. In some implementations, portions of that resulting edge detection may be extracted and used in addition to, or instead of, the edge domain representation of the whole document. As another example, in some implementations, an object detector (not shown) may be used to identify the portion, in FIG. 5, associated with the document image holder and extract those portions as shown in portion 610 of FIG. 6.

In some implementations, only certain portion(s) of the document may be converted into the edge domain by applying edge detection. For example, an object detector (not shown) or an optical character recognition (OCR) engine (not shown) identifies a portion of the document that includes a feature to be evaluated, i.e., an object or text, respectively, and that portion of the document (e.g., the portion within the bounding box applied by the object detector or OCR engine with or without a border around that area, depending on the implementation and use case) is obtained and converted into the edge domain by the edge detector 304.

In some implementations, the image edge detector 304 communicates an edge domain representation of a document or portion thereof to, or stores (e.g., in the document database 242), the edge domain representation for retrieval by one or more components of the document evaluator 226.

The boundary analyzer 306 analyzes an edge domain representation of at least a portion of a document under test to determine whether the document under test is likely to be authentic or inauthentic (e.g., tampered with, abused, void, or otherwise invalid). For example, the boundary analyzer 306 receives an edge domain representation of at least a portion of a document under test from the edge detector 304 and determines whether an anomaly indicative of potential manipulation exists. Examples of anomalies may include, but are not limited to, one or more of an expected edge that is missing, an expected edge that is discontinuous when it should be continuous, or an unexpected edge is present. For clarity and convenience, the description of the boundary analyzer 306, below, refers to the example CADL license illustrated in FIGS. 4-6, 10 and 11, and the Hong Kong Permanent Identity Card (HK ID) of FIGS. 7-9B.

In some implementations, the boundary analyzer 306 performs an analysis that includes a comparison of an edge domain representation of the document under test (or portion thereof) to one or more valid instances (or portions thereof). Depending on the implementation and use case, the type of comparison may vary. For example, in some implementations, a similarity or matching technique may be applied to determine a similarity score between the document under test, or portion thereof, and the one or more valid instances, or corresponding portion(s) thereof, may be generated and determine whether the document under test is consistent with a valid document instance and less likely to be inauthentic. In other implementations, a machine learning model may be trained using one or more valid instances (e.g., labeled for supervised machine learning or unlabeled for unsupervised machine learning), validated, and deployed to determine whether the document under test includes an anomaly indicative of inauthenticity.

In some implementations, the boundary analyzer 306 includes a boundary determiner 322 and a consistency determiner 322 as illustrated in FIG. 3. The boundary determiner 322 determines a set of edges associated with a boundary. The boundary may vary depending on one or more of the implementation, use case, document under test, and security feature.

In some implementations, the boundary determiner 322 identifies a boundary associated with a security feature. For example, the boundary determiner 322 identifies a boundary as a set of edges representing a perimeter of the document holder image in the edge domain representation or, depending on the implementation, based on a bounding box applied by an object detector (not shown) that detects the presence of the document holder image object. For example, referring now to FIG. 10, a portion 1000 of a CADL is shown. As illustrated, the portion 1000 depicts the top-right corner of the document holder image 1002 and some of the boundary between the document holder image 1002 and the bordering portion 1004 of the CADL ID document. The area 1006, which has been hash marked, around this boundary may include one or more edges that may be of interest. For example, there is a holographic seal that crosses the boundary, the border between the image and the surrounding portion of the document, and microprint that crosses the boundary, which are edges expected to be present in a valid instance and may be analyzed by the consistency determiner 324 described below. It should be noted that the hashed area, while not illustrated, may continue around the entire perimeter of the document holder image and/or in an up-side-down horseshoe shape around the head and hair of the document holder.

As another example, the size of the head in a document holder image often must fall within a threshold in valid document instances in some implementations, the boundary determiner 322 may determine a boundary (e.g., based on issuer documentation) associated with or slightly larger than the maximum valid head size and a boundary associated with the minimum valid head size (or the document holder's silhouette in the document under test) so that region may be identified and analyzed, e.g., to determine when microprint that should appear in at least a portion of that area is not present in an area between the document holder's head and just outside the maximum valid template head size.

Figure 8A:
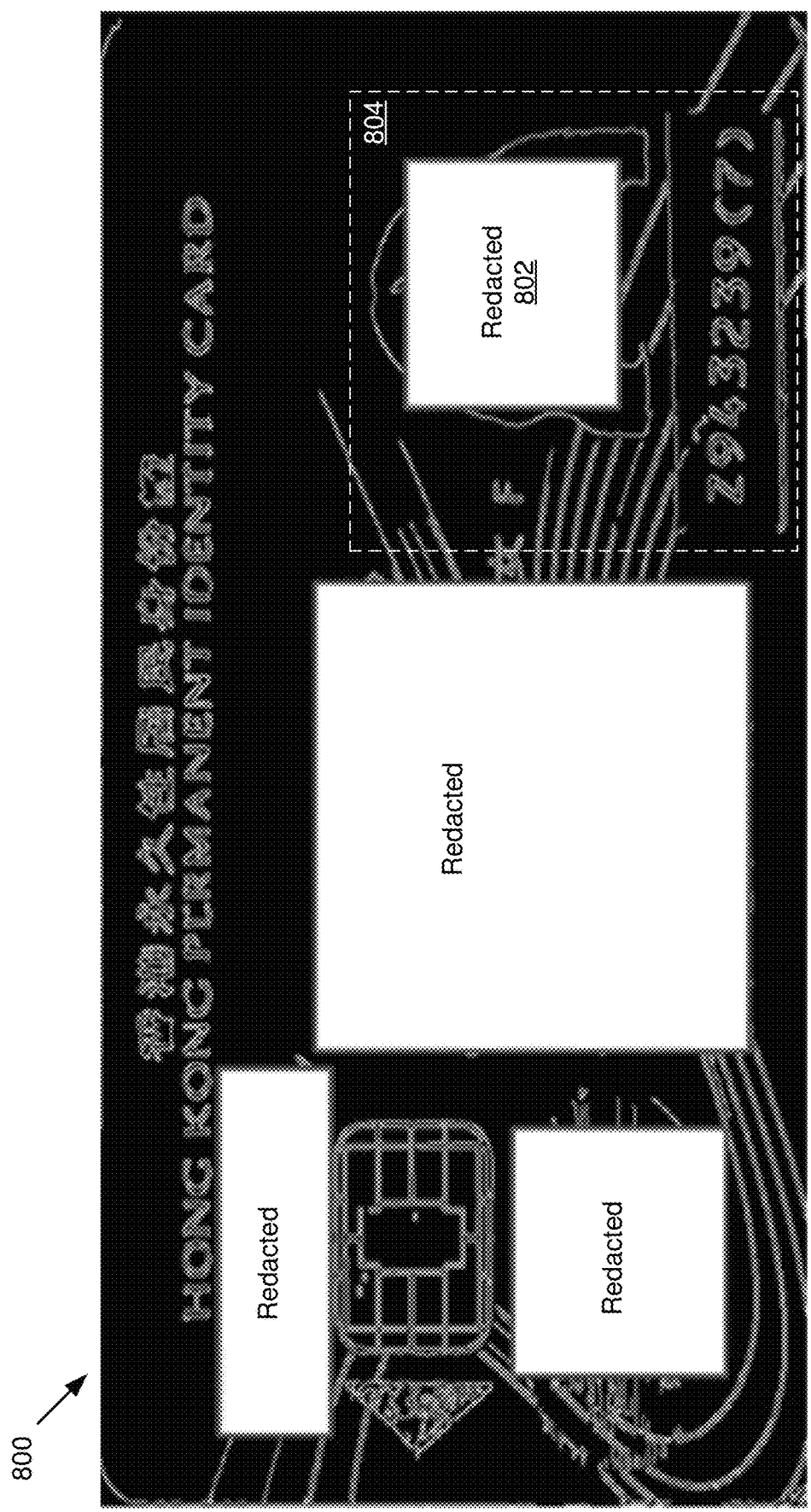
FIG. 8A illustrates an example of an edge domain representation of the fraudulent Hong Kong Permanent Identity Card in accordance with some implementations.
Figure 9A:
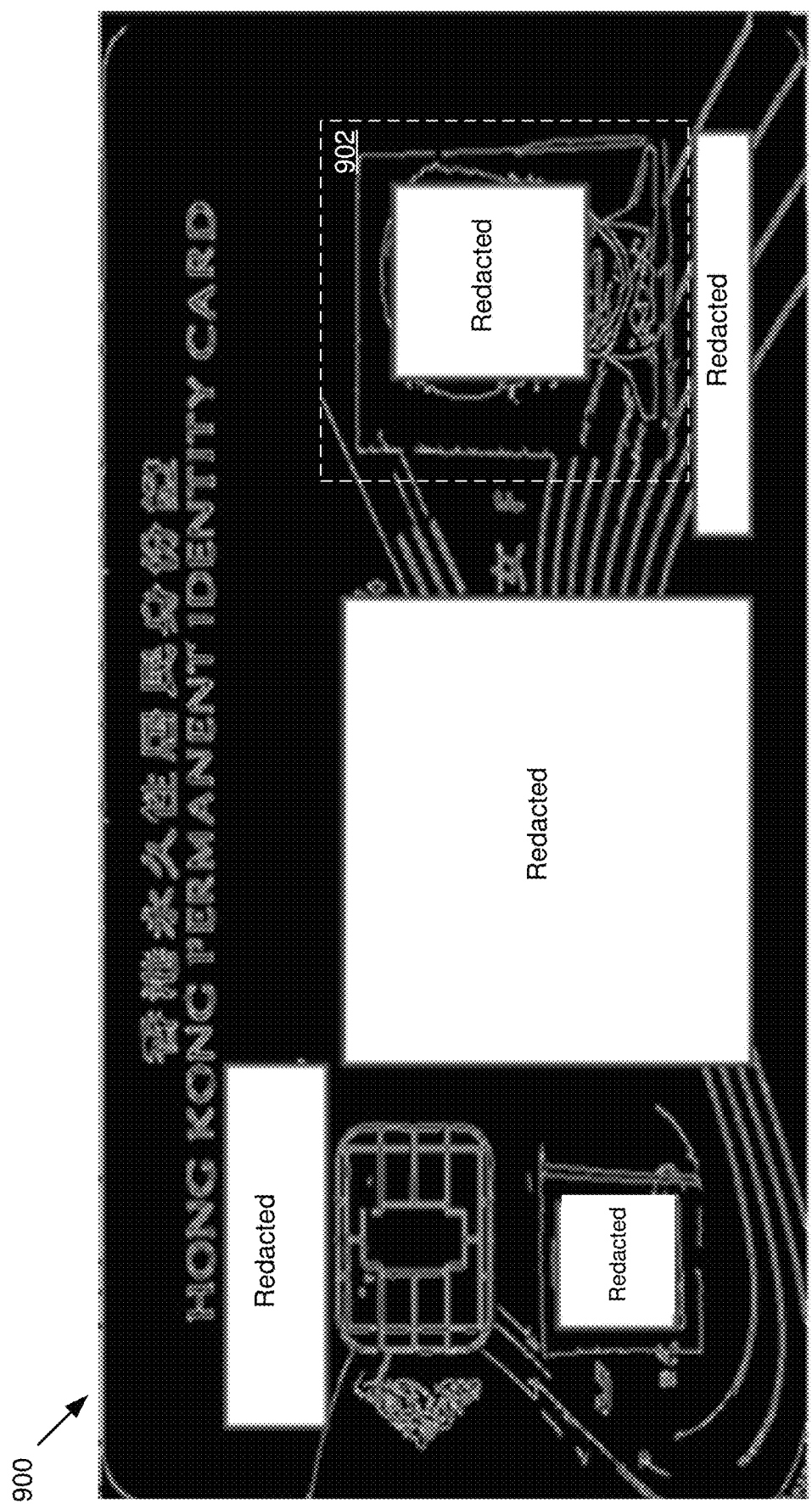
FIG. 9A illustrates an example of an edge domain representation of another fraudulent Hong Kong Permanent Identity Card example in accordance with some implementations.
Figure 9B:
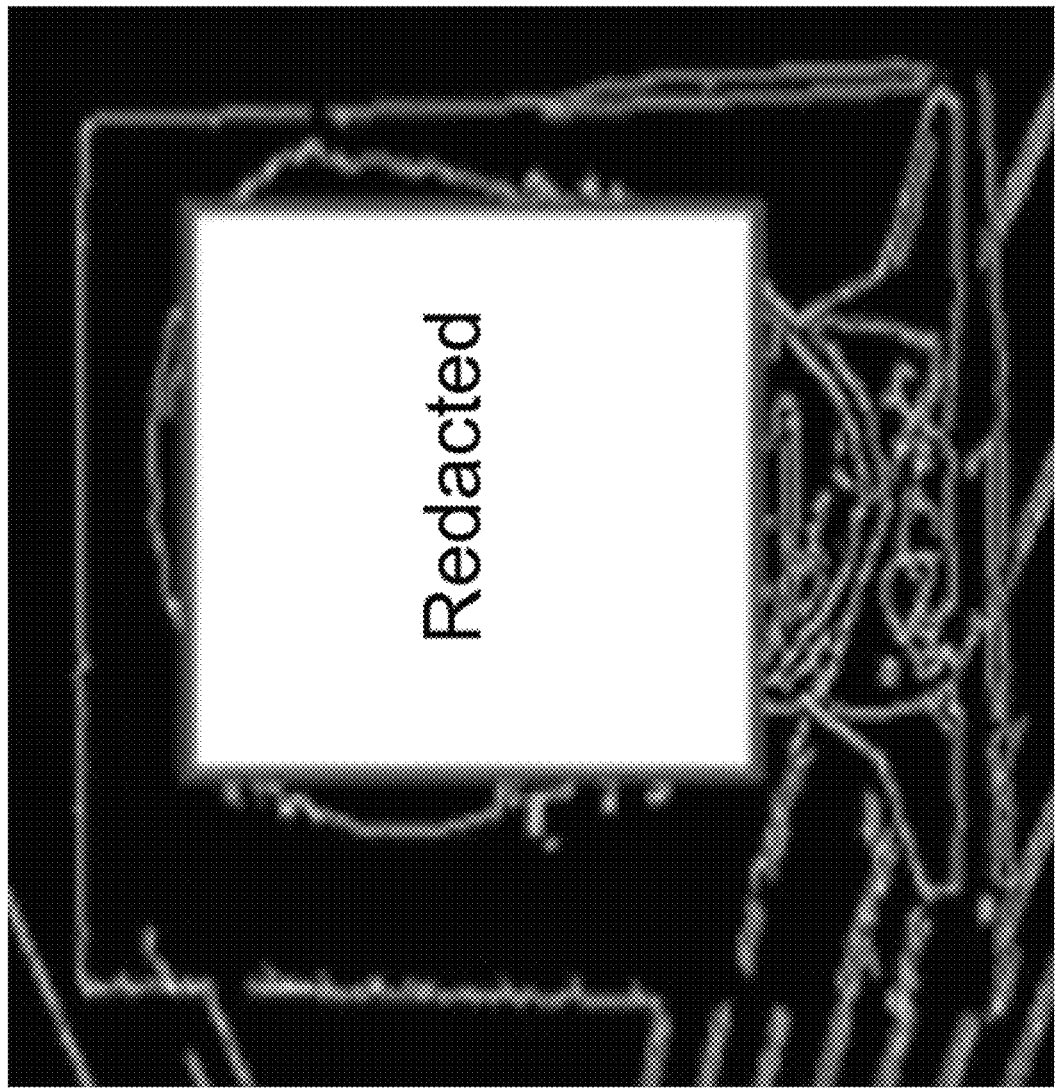
FIG. 9B illustrates a magnified example of an edge domain representation of a portion of the other fraudulent Hong Kong Permanent Identity Card example in accordance with some implementations.

As another example, in some implementations, the boundary determiner 322 may determine the boundary around the document holder image in portion 902 of FIGS. 9A and 9B. The edges creating a partially enclosed rectangular boundary around the facial image in 902 is not present, or expected to be present, in a valid instance. This is apparent when comparing area 902 in FIGS. 9A and 9B to area 804 in the edge domain representation of FIG. 8A of the HK ID, where the document holder image in 804 is not manipulated, and an analogous boundary around the facial image is not present. Such a boundary around the facial image may be the result of digital manipulation (e.g., copy/pasting a document holder image into the document under test image using image editing software, such as Adobe Photoshop) or a manual manipulation (e.g., by placing a physical photo of a face over that portion of the ID and submitting an image of that as the document under test).

In some implementations, the boundary determiner 322 determines a set of one or more boundaries based on a classification of the document under test. For example, the boundary determiner 322 receives a classification associated with the CADL example and determines a set of boundaries associated with that class of document, i.e., that version of the CADL.

In some implementations, the boundary, or portion thereof, may be associated with one or more edges in the edge domain representation. For example, a boundary around a document holder image (e.g., corresponding to the dashed line defining portion 410 in FIG. 4) or outlining the text characters in a field or filed label, etc. may be represented by edges in the edge domain.

Figure 14:
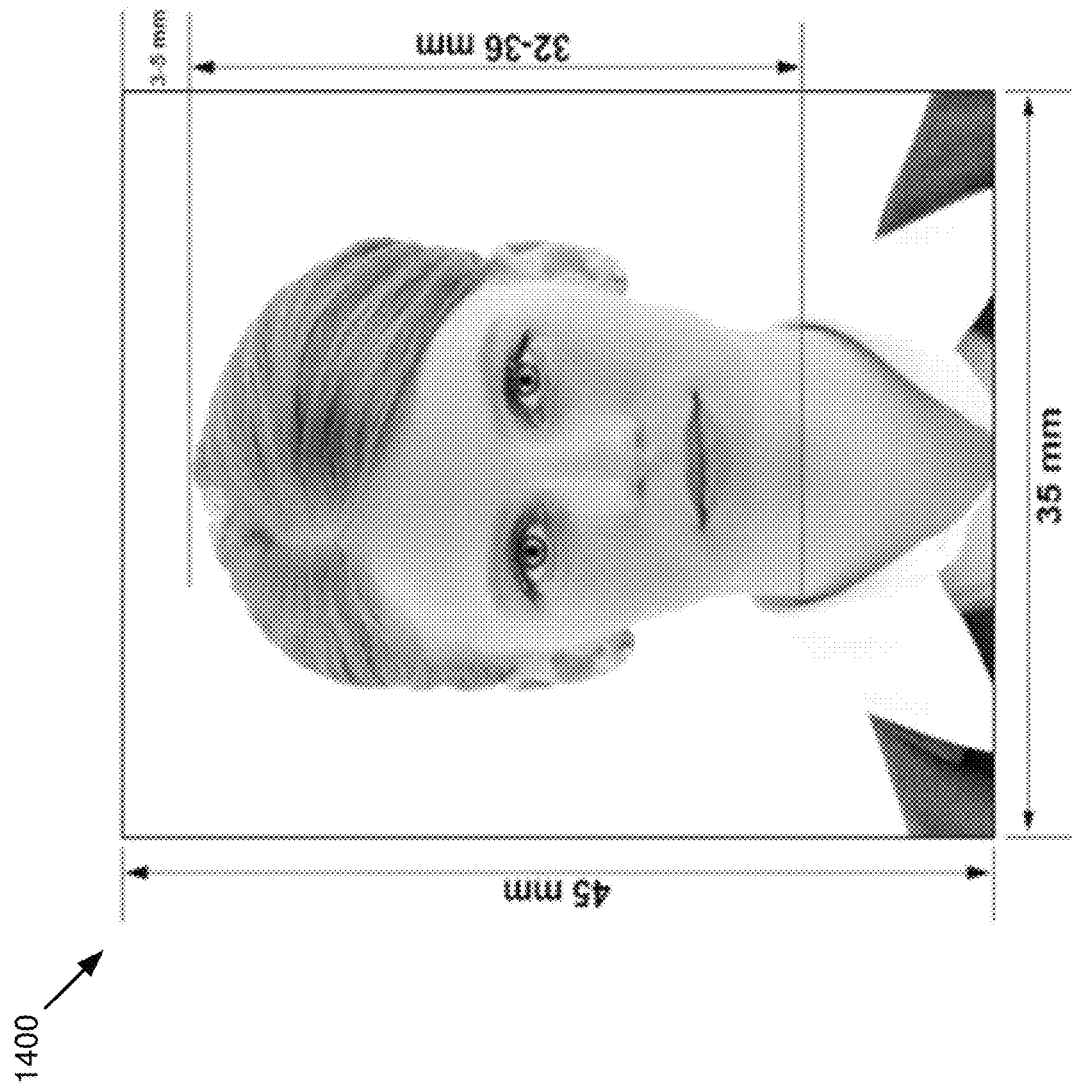
FIG. 14 illustrates an example of dimensions related to a document holder image provided by an issuer, which may be used to at least partially determine a boundary in accordance with some implementations.

In some implementations, the boundary, or portion thereof, may not be associated with, or represented by, an edge in the edge domain. For example, identification documents may specify a head size range for valid instance. An example of dimensions defining valid dimensions (or proportions) for a document holder image in a Netherlands passport is provided in FIG. 14. While the top of the user's head is represented in the edge domain the 3 mm to 5 mm gap between the top of the head and the edge of the document holder image, defined by the issuer, is not itself represented by an edge, but, in some implementations, the 3 mm-5 mm gap may be used as a boundary, e.g., to determine whether an edge associated with the user's head crosses the a portion of the boundary corresponding to 5 mm from the top edge of the document holder image and/or does not cross the boundary corresponding to 3 mm from the top edge of the document holder image. As another example, referring to FIGS. 8A and 8B or a rectangular boundary (not shown) around the document holder image may be determined by the boundary determiner 322, which may be larger than the rectangle used to redact the face at 802 so that the document holder's hair would fall within the boundary (not shown).

In some implementations, a boundary may be associated with a security feature that is present in valid instances (e.g., a border around the document holder image in a CADL, or a silhouette of a document holder, etc.). In some implementations, a boundary may be associated with invalid instances (e.g., the border around the document holder image 902 in FIGS. 9A and 9B.)

It should be recognized that the foregoing are merely examples of boundaries and others exist and may be used without departing from the disclosure herein. For example, a boundary may be associated with or represent one or more of, but not limited to, a bounding box, a security feature, a field, a field label, text, an object, an image, a document holder image, a ghost image, a watermark, a hologram, a silhouette, a seal, one or more internal or external shapes or features therein, etc.

In some implementations, the boundary determiner 322 determines a boundary at least partially based on one or more edges that are expected to be variable, or dynamic, between document instances, even valid document instances, such as document numbers, facial images, birth dates, expiration dates, issue dates, etc. that may be specific to a particular document instance. In some implementations, the boundary determiner 322 identifies the variable portion(s) and determines the boundary, which may be used to effectively redact the variable portions.

In some implementations, the boundary determiner 322 determines a static boundary to redact a variable portion of a document. For example, referring now to FIG. 15A, an example of a document holder image 1500 from a valid Canadian passport provided by the issuer is shown. In the Canadian passport, the document issuer has requirements (not shown) regarding the dimensions, or the proportions for the holder's head, which may be different than, but analogous to those shown for the Netherlands passport in FIG. 14. In some implementations, the boundary determiner 322 determines the upside-down horseshoe-shaped polygon illustrated at 1502, with static proportions or dimensions, based on the issuer's specification and/or one or more valid instances, e.g., an instance including document holder image 1500. While the face of the document holder is expected to vary from document-to-document even in valid instances, the surrounding microprint and edges (ignore the laser perforations for the purpose of this example) within 1502 should be consistent.

Figure 15B:
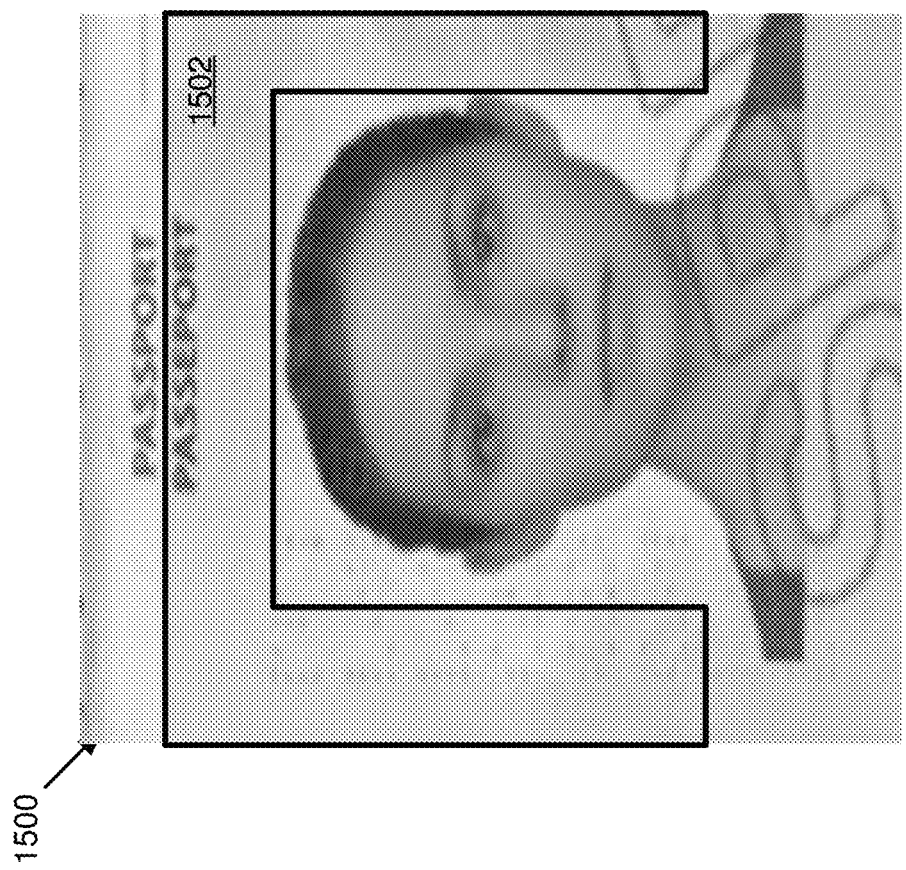
FIG. 15B illustrates an example boundary associated with the portion of a valid specimen of a Canadian passport that includes a document holder image in accordance with some implementations.
Figure 16B:
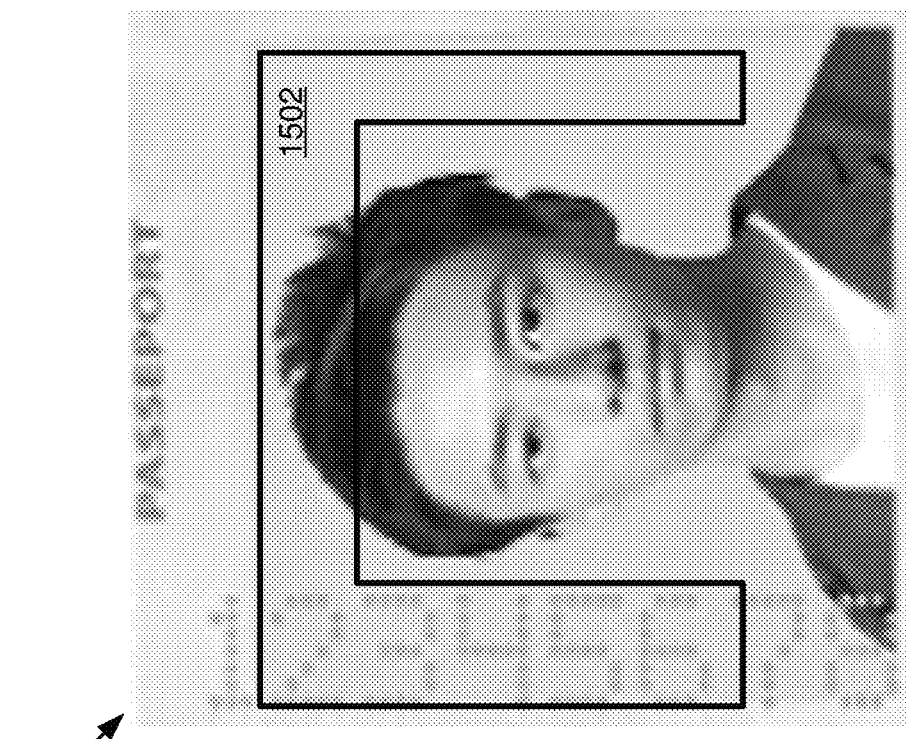
FIG. 16B illustrates another example of an application of the boundary to a fraudulent instance of a Canadian passport document under test in accordance with some implementations.
Figure 16A:
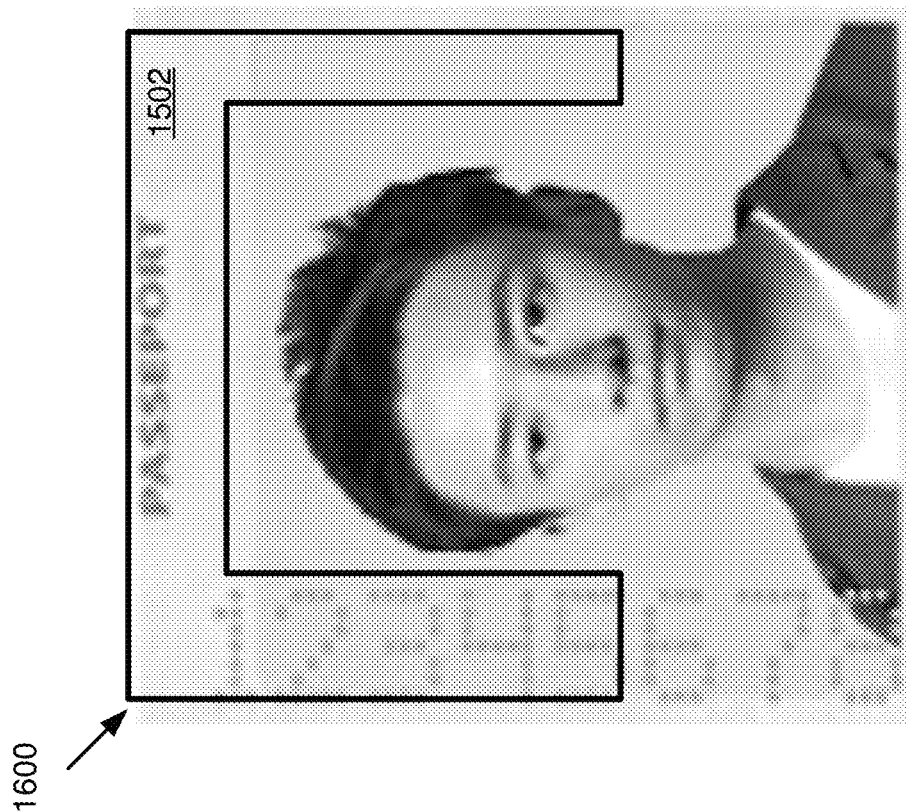
FIG. 16A illustrates an example of an application of the boundary to a fraudulent instance of a Canadian passport document under test in accordance with some implementations.

It should be recognized that while boundary 1502 is described as "static" the boundary 1502 and/or the document holder image under test may, in some implementations, be one or more of scaled, rotated, and translated when applied to a document under test. In some implementations, static may refer to proportions of the boundary. Referring to FIGS. 16A and 16B, an illustration of two example applications of the static boundary 1502 to a portion 1600 of an invalid Canadian passport that includes a document holder image are illustrated. In FIG. 16A, the top edge of boundary 1502 is determined and based on the location of the top-edge of the document holder image in valid instances. In FIG. 15B, the top edge of boundary 1502 falls just below the "PASSPORT" text and just above the "PASSEPORTE" text. In FIG. 16B, the top edge of boundary 1502 is determined and based on the location of the top-edge of the document holder image as detected, e.g., by an object detector (not shown). Accordingly, in FIG. 16B, the topmost edge of the boundary 1502 corresponds to the top edge of the document holder image represented by the line between the microprint and monochromatic background of the copy/pasted document holder image. It should be recognized that FIGS. 16A and 16B are merely examples to illustrate that the relative portion and/or application of a boundary may vary depending on the implementation. However, it should be recognized that other variations and examples are contemplated and within the scope of this description.

In portion 1600, common to both FIGS. 16A and 16B, a nefarious individual used photo editing software to add an invalid/fraudulent document holder image to the document image under test. As illustrated, portion 1600 has a number of issues indicative of invalidity including (1) there's a horizontal, top-edge of the document holder image below the text "PASSEPORT," which is not present in valid instances as represented in FIG. 15B (i.e., one or more unexpected edges are present in the edge domain when evaluated for consistency); (2) the background of the document holder in 1600 lacks the microprint including a maple leaf, which is present in 1502 of FIG. 15B (i.e., expected edges are absent in the edge domain when evaluated for consistency); and (3) in the case of 1502 in FIG. 16B, the document holder's hair is present (i.e., unexpected hair-related edges are present in the edge domain and the expected micro print edges are absent when evaluated for consistency).

It should further be recognized that using the upside-down horseshoe boundary of 1502, redacts the variation of the user's face, which makes training, validating, and applying machine learning or other forms of analysis more accurate and/or efficient by reducing one or more of the amount of information being processed and the noise introduced by the variations.

Figure 15A:
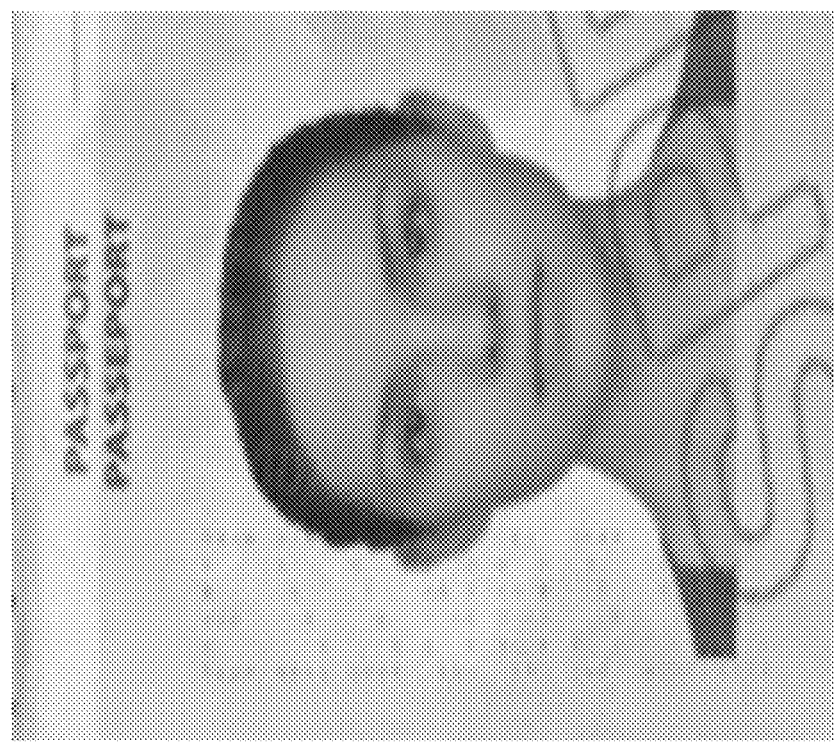
FIG. 15A illustrates an example portion of a valid specimen of a Canadian passport that includes a document holder image in accordance with some implementations.

In some implementations, the boundary determiner 322 determines a dynamic boundary to redact a variable, or document instance specific, portion of a document. For example, rather than the squared-off portion of the upside-down horseshoe bracketing the holder's head in 1502, the edges defining the outline, or silhouette, of the user in the document under test are determined, by the boundary determine 322, and define the boundary, which may allow, e.g., an evaluation of whether the maple leaf microprint in valid instances of the Canadian passport, as illustrated in FIGS. 15A and 15B extend all the way to the edge of the user's head, as it should in a valid Canadian passport instance, while accounting for the acceptable variations in head size and resulting obstruction, or obscuring, of different portions of the maple leaf microprint. It should be recognized that the evaluations herein may evaluate variable boundaries, dynamic boundaries, or a combination (in parallel or series) thereof.

The consistency determiner 324 determines whether the edge domain representation of the document under test or portion(s) thereof) are one or more of (1) consistent with one or more valid document instances or (2) internally consistent within the document under test.

The method the consistency determiner 324 applies to check the consistency may vary based on one or more of the implementation, use case, document under test, security feature, etc. Depending on the implementation the consistency may be determined by a direct comparison or indirect comparison. For example, the consistency check may be based on a similarity matching or score (i.e., a direct comparison) or one or more machine learning models (i.e., indirect), depending on the implementation, use case, document under test, security feature, etc. In some implementations, the consistency determiner 324 analyzes whether an edge that is present in valid instance is absent, inconsistent (e.g., discontinuous when it should be continuous or an edge is misaligned), or present in the edge domain representation of a document under test. In some implementations, the consistency determiner 324 analyzes whether an edge crosses a boundary, stops at a boundary, or is misaligned at a boundary.

For clarity and convenience, a number of consistencies are discussed by way of example herein. However, it should be noted that the examples are illustrative and selected for clarity of explanation and the scope of the disclosure is not limited to the examples and consistencies described herein.

Referring now to FIG. 7, an example of a rectified image of an altered HK ID 700 is illustrated in accordance with some implementations. In FIG. 7, a nefarious user has taken an otherwise valid HK ID card, printed an alphanumeric string on semitransparent paper trimmed the paper to be the approximate size of the field below the document holder's image in the HK ID, placed the semitransparent paper with the alphanumeric string over the existing field information, at 702, and then provided an image of the resulting, altered HK ID 700 for evaluation as a document under test. It should be noted that portions of the HK ID 700 have been redacted and are represented by white rectangles, and those white rectangles in FIGS. 7-8B are to protect the personally identifiable information and not representative of an output by the systems and methods herein. The example HK ID 700 was selected because the manipulation is rather crude and evident, even when reproduced in black and white patent figures. However, the systems and methods described herein work with more sophisticated or well executed manipulations. Furthermore, while it may be human evident, the systems and methods described herein rely on computer vision, and what may be evident to a human observer is not necessarily evident to a computer and vice versa.

Figure 8B:
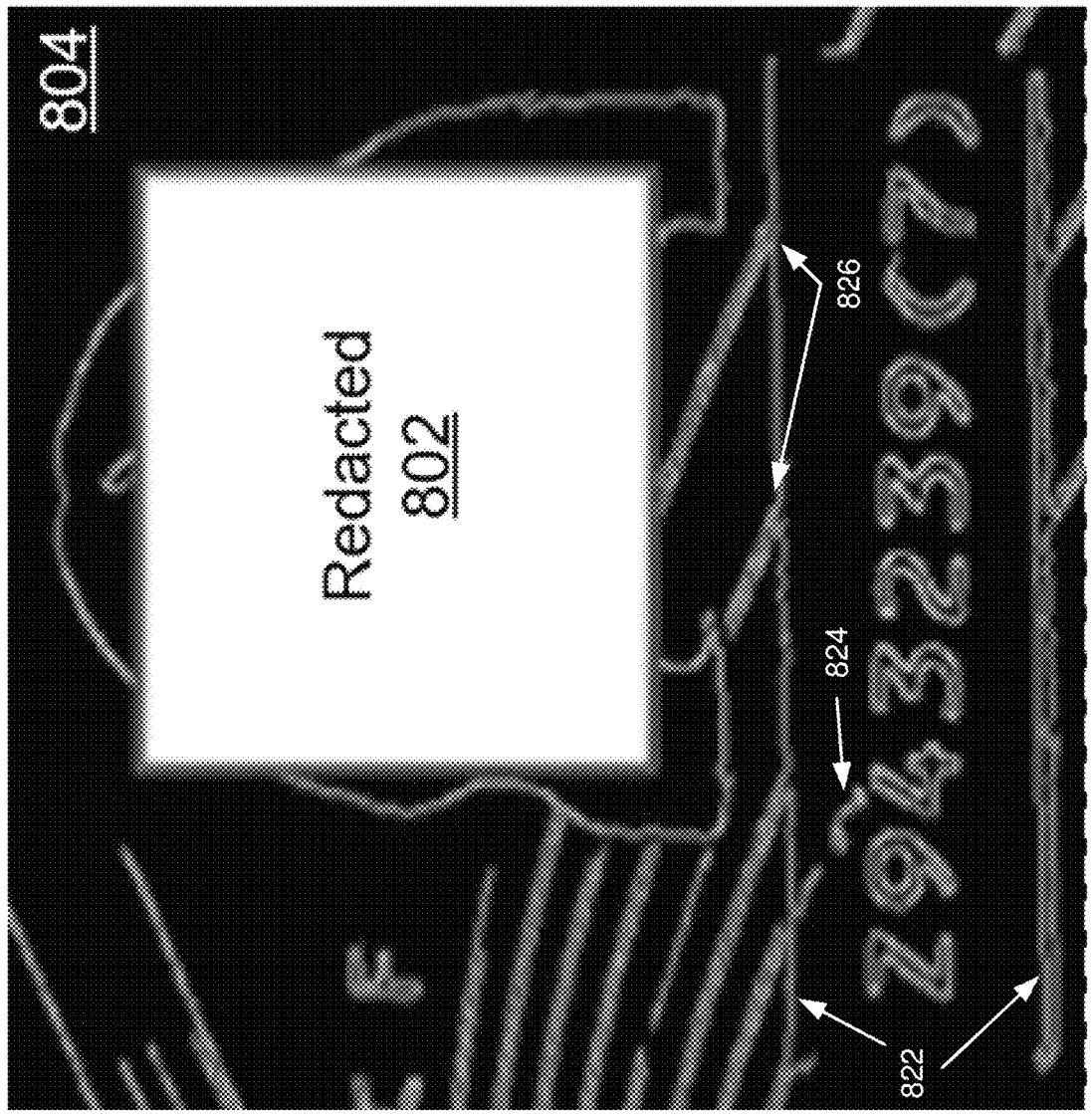
FIG. 8B illustrates a magnified example of an edge domain representation of a portion of the fraudulent Hong Kong Permanent Identity Card in accordance with some implementations.

Referring now to FIG. 8A, an illustration of an edge domain representation 800 of the HK ID 700 that has been generated, by the edge detector 304 in accordance with some implementations and is shown. Portion 804, which includes the alphanumeric overlay, is magnified and reproduced in FIG. 8B.

Referring to FIG. 8B, in some implementations, the consistency determiner 324 determines that the presence of edges 822, which represent the top and bottom edges of the piece of paper that overlayed the HK ID and which may have been identified as a boundary, is inconsistent with a valid instance, as valid instances are not expected to contain an edge there. In some implementations, the consistency determiner 324 determines that the rays, which should be continuous in the area of the alphanumeric string are discontinuous, e.g., at points 826, which is inconsistent with a valid instance. In some implementations, the consistency determiner 324 may determine that the edge 824 is discontinuous and/or misaligned with the portion of the "ray" in the microprint background above the upper boundary 822, which is inconsistent with a valid instance.

Still referring to FIG. 8B, it should be noted that the some of the "rays" extend up to the long hair of the document image holder and then continue on the other side of the hair. In some implementations, the consistency determiner 324 may analyze whether edges, e.g., associated with microprint extend up to, or within a threshold distance of, an edge or boundary (e.g., associated with the user's silhouette). Such an analysis may catch instances where a nefarious user digitally erases a document holder's head and copy-pasted his/her own image, which is slightly smaller, into the document image under test.

Referring to FIG. 9B, in some implementations, the consistency determiner 324 may determine that one or more of the following are inconsistent with a valid document instance (1) the set of edges representing a rectangular boundary around the document holder image, (2) absence of one or more portions of the ray microprint extending beyond that boundary, (3) a discontinuity in at least one ray, and (4) a misalignment of one or more rays (e.g. near the bottom-left corner).

Figure 10:
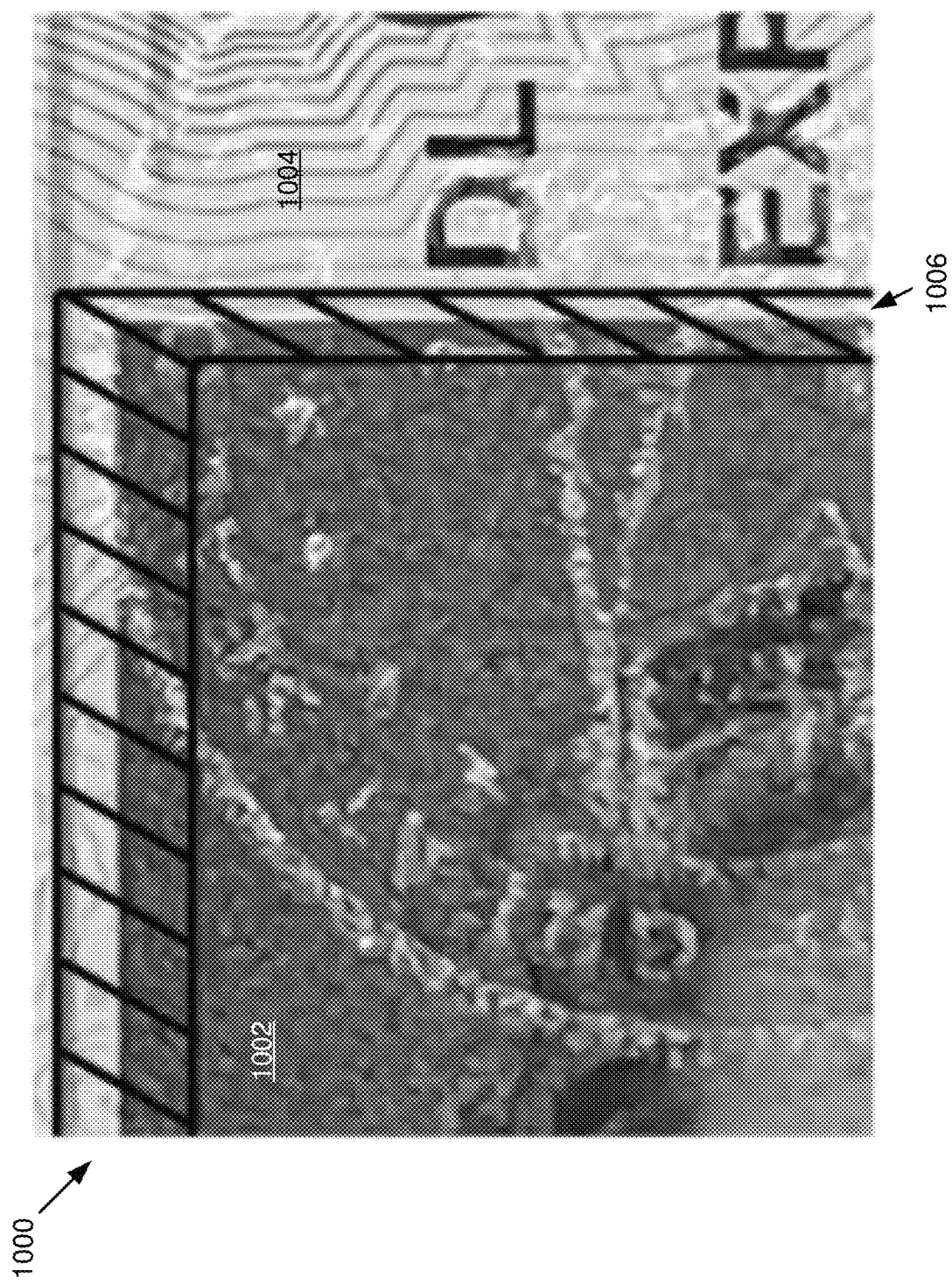
FIG. 10 is an example illustration of a portion of an example California Driver's License in accordance with some implementations.

Referring now to FIG. 10, while an edge domain representation is not illustrated, the consistency determiner 324 may determine whether edges associated with the holographic seal are present and continuous and whether microprint crossing the boundary of the document holder image 1002 is present, continuous, and aligned.

The consistency determiner 324 determines whether the edge domain representation of the document under test is internally consistent within the document under test, as the internal consistency of repeated information may be indicative of authenticity and inconsistency may be an anomaly indicative of inauthenticity. Some documents include information that may be specific to, or unique, to a document instance, and some valid documents may repeat at least a portion of this information. For example, a date of birth, document number, the document holder's visage, etc. may be repeated in a valid document instance. In some implementations, a set of edges from different portions of the document under test may be compared for consistency. For example, edges in the edge domain representation of the ghost image illustrated in 620 of FIG. 6 may be scaled and compared with edges present in the edge domain representation of the document holder image in portion 610 of FIG. 6 to determine whether the silhouettes in both images are consistent.

As described above, in some implementations, a boundary may be determined, by the boundary determiner 322, to redact expected variations. In some implementations, the consistency determiner 324 may ignore (e.g., unredacted) edges associated with expected variations. For example, in some implementations, the consistency determiner 324 ignores the edges associated with the facial features, e.g., the boundary determiner 322 determines a boundary that is the silhouette (e.g., outer outline of the head and hair) and lacks the facial feature edges for both portions 610 and 620 and those boundaries are compared, which may involve translation, rotation and scaling.

Figure 11:
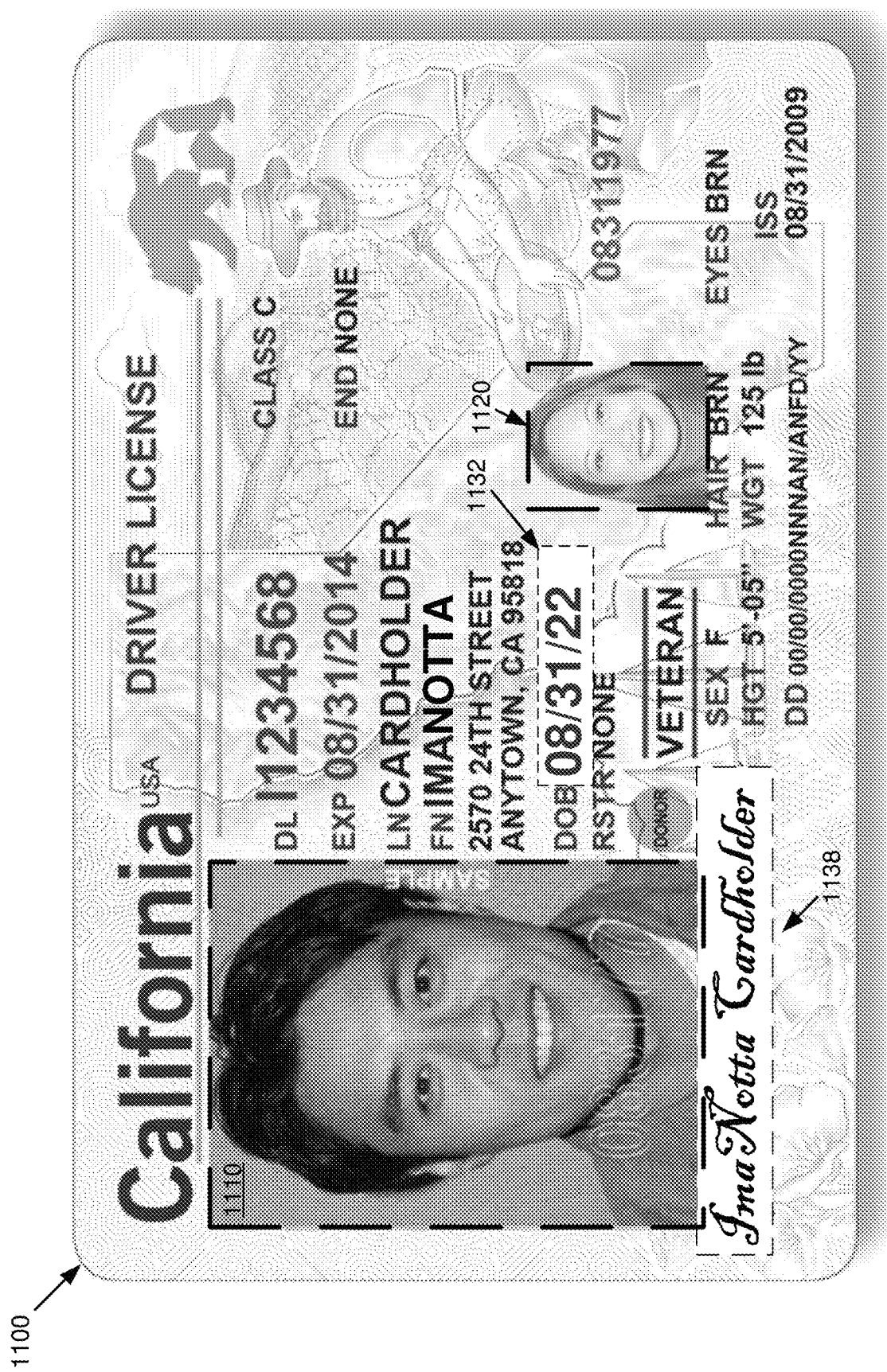
FIG. 11 illustrate an example of a CADL under test in accordance with some implementations.

Referring to FIG. 11, the silhouettes would not be consistent in the case of CADL 1100, as the document holder image 1110 and ghost image 1120 are of different people and not internally consistent. Additionally, portions 1138 and 1132 have been digitally altered by adding text with a white background, which in the edge domain representation (not shown) may result in boundary edges at, near, or along the dotted lines outlining portions 1138 and 1132 and a lack of edges associated with the microprint background. For example, portions of the California state border may be absent in area of 1132 on the edge domain representation (not shown) of CADL 1100 and edges associated with the flower petals may be absent in area of 1138 on the edge domain representation (not shown) of CADL 1100.

It should be recognized that for artificial intelligence/machine learning many instances (e.g., hundreds or thousands) are needed to train a reliably accurate model. In cases such as a newly issued document (e.g., a new driver's license), this poses a challenge sometimes referred to as the "cold start problem," i.e., there is not enough data (e.g., valid and/or invalid instances of that document) to begin training a reliable model. Additionally, when sufficient data is available, it may take weeks or months to train, validate, and optimize an AI/ML model. This delay may result in suboptimal outcomes such as not supporting the document, which may anger and frustrate users or customers, as their valid documents cannot be used and they may not have an alternative, supported document available. In some implementations, the systems and methods described herein, using edge detection, may start analyzing documents under test with one or more valid examples (e.g., using a similarity comparison) and a machine learning model may later be trained (e.g., using supervised learning and labels assigned by the initial similarity comparison method to documents under test as training data).

It should be recognized, while the foregoing makes repeated reference to example documents that are government issued identification documents, such as ID cards, voter cards, passports, driver's licenses, visas, etc., and more particularly to an example California Driver's License (CADL) and HK ID, other documents exist and may be supported by the system 100. For example, financial documents (e.g., check, bearer bonds, stock certificates, bills, etc.) or other documents may be supported and evaluated by the system 100.

It should be recognized that, while some of the issues in fraudulent examples of FIGS. 7-9B and 14 are intentionally unsophisticated and the example issues are relatively apparent and numerous for discussion purposes and clarity of demonstration. Digital image manipulation (e.g., using photoshop) is increasingly available and used by nefarious individuals to generate fraudulent documents, and fraud attempts vary in levels of sophistication. The computer-vision (e.g., OCR, object detection, similarity matching, and anomaly detection) based methods described herein may beneficially detect even sophisticated fraud attempts by identifying issues undetectable to a human eye, such as an imperceptible (to a human) discrepancy in the relative positions, alignments, additions of edges or absences of edges.

In some implementations, the outcome of the boundary analyzer 306 or a subcomponent thereof, such as consistency determiner 324, may not be definitive for determining whether the document under test is valid or invalid. For example, certain edges may trigger more or fewer false positives or false negatives. For example, assume an inconsistency where microprint does not reach all the way to a silhouette in accordance with valid instances may trigger false positives for invalidity (or false negatives for validity) where the document holder's hair style is spikey (e.g., because an edge along the spikey perimeter may not be detected or continuous). In some implementations, the result (s) of boundary analyzer 306 are occasionally used and referred to as intermediary results.

The decision engine 308 determines whether to verify the document under test. In some implementations, the decision engine 308 obtains a set of the intermediary results including at least one from the boundary analyzer 306 or subcomponent thereof (e.g., the consistency determiner 324) and, based on at least a subset of the intermediary results, determines whether the document under test is a valid instance of the document. In some implementations, the decision engine 308 may obtain the intermediary results from the document database 242. In some implementations, the subset includes an intermediary result based on an analysis of one or more edges in the document under test, e.g., output by the boundary analyzer 306 or subcomponent thereof (e.g., the consistency determiner 324).

In some implementations, the decision engine 308 obtains other information (e.g., context information, a decision history, etc.) and, based at least in part on the other information, determines whether the document under test is a valid instance of the document. For example, the decision engine 308 may query the document database 242 to determine whether the user's information (e.g., client device 106 identifier) is associated with previously received and rejected as invalid documents, to determine whether the document ID number in the document under test (e.g., a driver's license number) has been associated with other verification requests and whether the document was determined to be verified/valid or invalid and/or associated with different information (e.g., different names appearing on different documents with the same doc ID).

Depending on the implementation and use case, the decision engine 308 may apply one or more of heuristics, statistical analysis, and AI/ML model(s) to determine whether the document under test is verified. For example, the decision engine 308 may determine one or more heuristics, such as reject the document under test as invalid when the silhouettes in the facial image and ghost image do not match or reject the document under test as invalid when microprint is discontinuous or misaligned across a boundary. As another example, the decision engine 308 may use statistical analysis, such as assigning a value of "1" to an intermediate result that indicates a match/similarity/consistency and a "0" to an intermediary result that indicates an anomaly/mismatch/inconsistency is detected and determining whether an average or weighted average satisfies a verification threshold. For example, the decision engine 308 may use machine learning to perform feature set reduction to reduce (e.g., based on information gain) the number of intermediary results (and associated evaluations) used for a particular document and tune associated parameters (e.g., their relative weighting in a weighted average). It should be noted that the above are merely examples of heuristics, statistical analysis, and AI/ML models that may be used by the decision engine 308. The decision engine 308 may use other or different mechanisms without departing from the disclosure herein.

The decision engine 308 returns a verification result. For example, the decision engine 308 returns a result to a requesting customer, such as a bank, indicating that the document (e.g., the imaged photo ID) is not verified/invalid or is valid. As another example, the decision engine 308 returns a result to other system components, such as a liveness detector (not shown). In some implementations, a liveness detection may be performed before, or in parallel, with evaluation of the document by the document evaluator 226.

In some implementations, the decision engine 308 triggers an action or inaction based on the verification result. The liveness detector (not shown) may, e.g., compare a selfie of the user that provided the document image to the facial image in the document. In some implementations, the liveness detector (not shown) may be triggered by the decision engine 308 to execute based on the document being verified, as it may not be worth the time and computational resources to determine whether the person in the selfie is the same person in the fake ID document. In some implementations, the decision engine 308 may trigger other actions such as contacting law enforcement of the jurisdiction in which the user's client device 106 is located (e.g., to report the attempted fraud or identity theft and providing associated information).

In some implementations, the systems, methods, features and functionalities described herein allow for faster processing and return of result(s). For example, in some implementations, the intermediate evaluations, sometimes also referred to as verification checks, are decoupled and/or may be performed asynchronously. As an example, the edges associated with multiple portions of the document under test may be evaluated in series and/or parallel to determine, which may occur in series or in parallel with other evaluations. As another example, evaluations/verification checks may be tiered, so that results may be returned more quickly. For example, a set of security features associated with recent fraud attempts using a particular document may be checked/evaluated first to triage requests involving that document classification, and when those initial checks (e.g., based on one or more edges) are passed, additional checks (e.g., based on one or more edges) may or may not be performed. As another example, the number and/or types of checks and evaluations may vary depending on a risk assessment, e.g., how likely the document under test is likely to be invalid, so documents that are more frequently used by fraudsters, or that come from sources (e.g., devices, IP addresses, countries, etc.) associated with prior invalid attempts, etc. may receive additional scrutiny via the use of more evaluations, while lower risk documents may be evaluated using fewer and/or less (time or computationally) intensive evaluations of one or more edges, thereby improving system throughput, efficiency, and costs while mitigating the risk of false negatives.

In some implementations, the generation and/or persistence in the document database 242 of the intermediary results may provide auditability. For example, assume it becomes apparent that the decision engine 310 is not rejecting documents exploiting a particular attack vector and provides a false negative on fraud. In some implementations, the document database 242 may query the decision history for documents of that document class which that passed (e.g., as an overall verification decision) and had valid intermediate result(s) associated with the document number. In some implementations, the decision engine 310 or a portion thereof may be executed to determine whether, which, or how many documents were incorrectly verified and, potentially, trigger remedial action.

In some implementations, the generation and/or persistence in the document database 242 of the intermediary results may provide transparency. For example, the intermediate result(s) may be used to at least partially explain a rejection or acceptance of a document under test. Such transparency may be of help in compliance to demonstrate that acceptances or rejections are based on appropriate criteria and not inappropriate or forbidden criteria (e.g., race, sex, country of origin, etc.).

In some implementations, the systems, methods, features and functionalities described herein may be layered with others. For example, the systems, methods, features and functionalities described herein may, in some implementations, be used in conjunction with liveness detection, so that, when an identification document is valid, a liveness detector (not shown) may determine whether a user that submitted the document is live and whether his/her face matches the photo in the ID.

As another example, in some implementations, the systems, methods, features and functionalities described herein may, in some implementations, be layer with human auditors or reviewers, who may confirm and/or reject an intermediate or overall result or may be looped in under certain circumstances or predefined criteria.

For example, in some implementations, the systems, methods, features and functionalities described herein may be layered with machine learning. For example, to perform additional validity checks or modify the evaluations performed by the decision engine 310 (e.g., change an order of evaluations, change a risk tier in a document assembly object thereby changing the evaluations to which those documents under test are subjected, perform a feature set reduction and reduce the number of verification checks in the document assembly object or which verification checks are performed on a document, etc.). In some implementations and use cases, the use of computer-vision including edge detection and one or more matching algorithms may be robust compared to and may supplement a more volatile machine learning data extraction pipeline and/or provide a set of signals, which may be weak individually, for stacking in a machine learning model.

Example Methods

Figure 12:
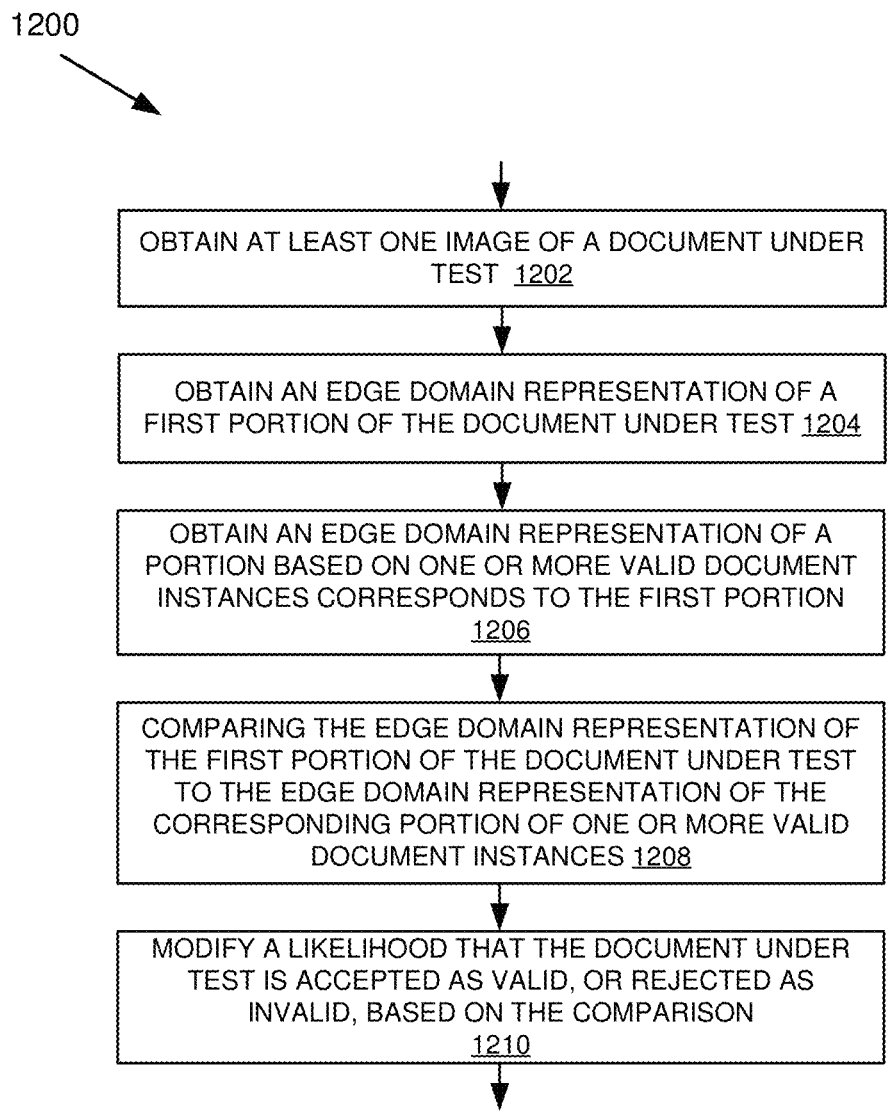
FIG. 12 is a flowchart of an example method for an edge domain analysis of a document under test in accordance with some implementations.
Figure 13:
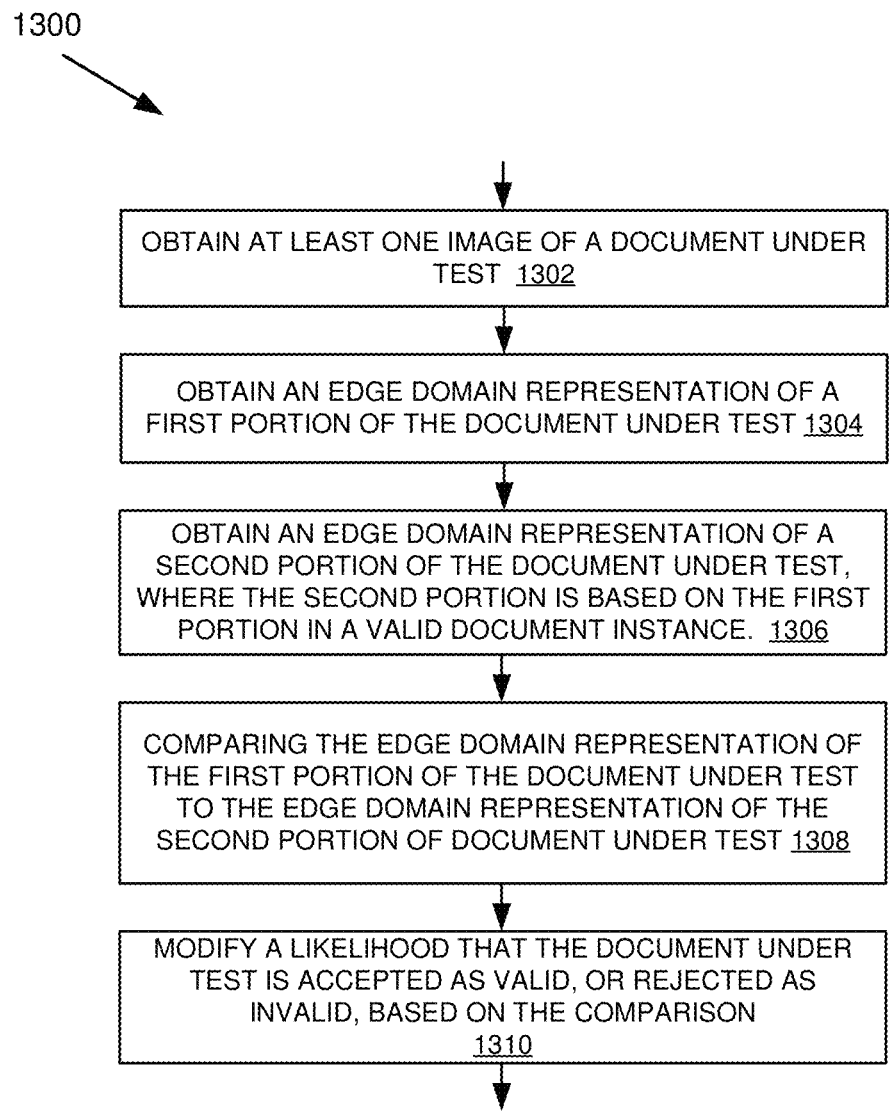
FIG. 13 is a flowchart of another example method for an edge domain analysis of a document under test in accordance with some implementations.

FIGS. 12 and 13 are flowcharts of example methods that may, in accordance with some implementations, be performed by the systems described above with reference to FIGS. 1-3. The example methods 1200 and 1300 of FIGS. 12 and 13 are provided for illustrative purposes, and it should be understood that many variations exist and are within the scope of the disclosure herein.

FIG. 12 is a flowchart of an example method 1200 for analyzing an edge domain of a document under test in accordance with some implementations. At block 1202, the image preprocessor 302 obtains an image of a document under test. At block 1204, the edge detector 304 obtains an edge domain representation of a first portion of the document under test. At block 1206, the boundary analyzer 306 obtains an edge domain representation of a portion, based on one or more valid instances, which corresponds to the first portion. At block 1208, the boundary analyzer 306 compares the edge domain representation of the first portion of the document under test with to the corresponding portion of one or more valid instances. At block 1210, the decision engine 308 modifies a likelihood the document under test is accepted as valid, or rejected as invalid, based on the comparison at block 1208.

FIG. 13 is a flowchart of another example method 1300 for analyzing an edge domain of a document under test in accordance with some implementations. At block 1302, the image preprocessor 302 obtains an image of a document under test. At block 1304, the edge detector 304 obtains an edge domain representation of a first portion of the document under test. At block 1306, the boundary analyzer 306 obtains an edge domain representation of a second portion of the document under test, where the second portion is based on the first portion in a valid document instance. At block 1308, the boundary analyzer 306 compares the edge domain representation of the first portion of the document under test to domain representation of the second portion of the document under test. For example, by comparing the edges in portion 610 to the edges in portion 620 of FIG. 6. At block 1310, the decision engine 308 modifies a likelihood the document under test is accepted as valid, or rejected as invalid, based on the comparison at block 1308.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   obtaining, using one or more processors, at least one image of a document;
   obtaining, using the one or more processors, an edge domain representation of a first portion of the document;
   comparing, using the one or more processors, the edge domain representation of the first portion of the document to an edge domain representation of a corresponding portion of one or more valid document instances, wherein the comparison identifies one or more of an absence of an expected edge, a presence of an unexpected edge, and a discontinuity of an expected edge; and
   modifying, using one or more processors, a likelihood that the document is accepted as valid, or rejected as invalid, based on the comparison of the edge domain representations associated with the document and corresponding portion associated with one or more valid document instances.

2. The method of claim 1, wherein obtaining the edge domain representation includes applying one or more of Prewitt edge detection, a Sobel edge detection, a Laplacian edge detection, Robert edge detection, and Canny edge detection.

3. The method of claim 1, wherein comparing the edge domain representation of the first portion of the document to an edge domain representation of a corresponding portion of one or more valid document instances comprises:
   identifying a boundary in the edge domain representation of the corresponding portion of one or more valid document instances; and determining whether an edge associated with the boundary in the edge domain representation of the one or more valid document instances is consistent with an edge in the edge domain representation of the first portion of the document.

4. The method of claim 3, wherein the boundary is based on a security feature and defines the first portion of the document where the security feature is present in the one or more valid document instances.

5. The method of claim 3, wherein the boundary is associated with one or more of a bounding box, a field label, a field, text, an image, a document holder image, a ghost image, a watermark, a hologram, a silhouette, and a seal.

6. The method of claim 3, wherein the edge associated with the boundary in the edge domain representation of the one or more valid document instances one or more of crosses the boundary or stops at the boundary.

7. The method of claim 1, wherein the corresponding portion of one or more valid document instances includes microprint that may be obstructed by document instance specific information, and wherein comparing the edge domain representation of the first portion of the document to an edge domain representation of a corresponding portion of one or more valid document instances comprises:
identifying, in the edge domain representation of the first portion of the document, a set of edges associated with the document instance specific information specific to the document; and
ignoring, in the comparison of the edge domain representation of the first portion of the document to the edge domain representation of the corresponding portion of one or more valid document instances, one or more portions enclosed by the set of edges associated with the document specific information specific to the document.

8. The method of claim 7, wherein the set of edges associated with the document instance specific information represent a silhouette of a document holder in a document holder image, and the comparison determines whether one or more of an edge associated with microprint is present in a background of the document image holder and whether the edge associated with the microprint extends to the silhouette of the document holder image in the document.

9. The method of claim 7, wherein the set of edges associated with the document specific information specific to the document represents a silhouette of a document holder in a document holder image, the method further comprising:
obtaining an edge domain representation of a second portion of the document, the second portion of the document including, in valid instances, a ghost image of the document holder's image;
comparing a set of edges representing a silhouette from the ghost image to the set of edges representing the silhouette in the document holder image; and
determining, based on the comparison, whether a match between the silhouette from the ghost image and the silhouette in the document holder image exists.

10. A system comprising:
a processor; and
a memory, the memory storing instructions that, when executed by the processor, cause the system to:
obtain at least one image of a document;
obtain an edge domain representation of a first portion of the document;
compare the edge domain representation of the first portion of the document to an edge domain representation of a corresponding portion of one or more valid document instances, wherein the comparison identifies one or more of an absence of an expected edge, a presence of an unexpected edge, and a discontinuity of an expected edge; and
modify a likelihood that the document is accepted as valid, or rejected as invalid, based on the comparison of the edge domain representations associated with the document and corresponding portion associated with one or more valid document instances.

11. The system of claim 10, wherein obtaining the edge domain representation includes applying one or more of Prewitt edge detection, a Sobel edge detection, a Laplacian edge detection, Robert edge detection, and Canny edge detection.

12. The system of claim 10, wherein comparing the edge domain representation of the first portion of the document to an edge domain representation of a corresponding portion of one or more valid document instances comprises:
identifying a boundary in the edge domain representation of the corresponding portion of one or more valid document instances; and
determining whether an edge associated with the boundary in the edge domain representation of the one or more valid document instances is consistent with an edge in the edge domain representation of the first portion of the document.

13. The system of claim 12, wherein the boundary is based on a security feature and defines the first portion of the document where the security feature is present in the one or more valid document instances.

14. The system of claim 12, wherein the boundary is associated with one or more of a bounding box, a field label, a field, text, an image, a document holder image, a ghost image, a watermark, a hologram, a silhouette, and a seal.

15. The system of claim 12, wherein the edge associated with the boundary in the edge domain representation of the one or more valid document instances one or more of crosses the boundary or stops at the boundary.

16. The system of claim 10, wherein the corresponding portion of one or more valid document instances includes microprint that may be obstructed by document instance specific information, and wherein comparing the edge domain representation of the first portion of the document to an edge domain representation of a corresponding portion of one or more valid document instances comprises:
identifying, in the edge domain representation of the first portion of the document, a set of edges associated with the document instance specific information specific to the document under test; and
ignoring, in the comparison of the edge domain representation of the first portion of the document to the edge domain representation of the corresponding portion of one or more valid document instances, one or more portions enclosed by the set of edges associated with the document specific information specific to the document.

17. The system of claim 16, wherein the set of edges associated with the document instance specific information represent a silhouette of a document holder in a document holder image, and the comparison determines whether one or more of an edge associated with microprint is present in a background of the document image holder and whether the edge associated with the microprint extends to the silhouette of the document holder image in the document.

18. The system of claim 16, wherein the set of edges associated with the document specific information specific to the document represents a silhouette of a document holder in a document holder image, the instructions, when executed, causing the system to:
- obtaining an edge domain representation of a second portion of the document, the second portion of the document including, in valid instances, a ghost image of the document holder's image;
- comparing a set of edges representing a silhouette from the ghost image to the set of edges representing the silhouette in the document holder image; and
- determining, based on the comparison, whether a match between the silhouette from the ghost image and the silhouette in the document holder image exists.

\* \* \* \* \*